US011193772B1

United States Patent
Kinnaman

(10) Patent No.: US 11,193,772 B1
(45) Date of Patent: Dec. 7, 2021

(54) AUTONOMOUS MERIT-BASED HEADING ALIGNMENT AND INITIALIZATION METHODS FOR INERTIAL NAVIGATION SYSTEMS, AND APPARATUSES AND SOFTWARE INCORPORATING SAME

(71) Applicant: Greensea Systems, Inc., Richmond, VT (US)

(72) Inventor: Benjamin W. Kinnaman, Bolton, VT (US)

(73) Assignee: Greensea Systems, Inc., Richmond, VT (US)

( * ) Notice: Subject to any disclaimer, the term of this patent is extended or adjusted under 35 U.S.C. 154(b) by 144 days.

(21) Appl. No.: 16/298,699

(22) Filed: Mar. 11, 2019

Related U.S. Application Data

(60) Provisional application No. 62/640,923, filed on Mar. 9, 2018.

(51) Int. Cl.
   *G01C 21/16* (2006.01)
(52) U.S. Cl.
   CPC .................. *G01C 21/16* (2013.01)
(58) Field of Classification Search
   CPC ...................................................... G01C 21/16
   See application file for complete search history.

(56) References Cited

U.S. PATENT DOCUMENTS

| | | | | |
|---|---|---|---|---|
| 6,266,623 | B1* | 7/2001 | Vock | A61B 5/11 |
| | | | | 702/44 |
| 9,880,003 | B2* | 1/2018 | Ganguli | G01C 25/005 |
| 2014/0165898 | A1* | 6/2014 | Cierpka | B63G 8/39 |
| | | | | 114/312 |
| 2014/0288896 | A1* | 9/2014 | Li | G06F 30/20 |
| | | | | 703/2 |
| 2015/0066240 | A1* | 3/2015 | Das Adhikary | G01C 21/12 |
| | | | | 701/1 |
| 2015/0308244 | A1* | 10/2015 | Cardamone | E21B 43/128 |
| | | | | 700/282 |
| 2016/0358477 | A1* | 12/2016 | Ansari | G06Q 30/0251 |
| 2017/0293307 | A1* | 10/2017 | Frolov | B64C 13/16 |
| 2018/0292232 | A1* | 10/2018 | Petillon | G01C 21/16 |
| 2018/0340779 | A1* | 11/2018 | Faulkner | F41G 7/36 |

* cited by examiner

*Primary Examiner* — Peter D Nolan
*Assistant Examiner* — Wae L Louie
(74) *Attorney, Agent, or Firm* — Downs Rachlin Martin PLLC

(57) ABSTRACT

Autonomous merit-based heading alignment and initialization methods for inertial navigation systems that update heading alignment in parallel with a heading estimation process. In some embodiments, such methods calculate figures of merit (FOMs) for multiple heading observations and estimate heading based on the calculate FOMs. In some embodiments, sensor data are genericized and published to a generic network, and multiple heading channels listen to the generic network for the published sensor data to make the heading estimation process sensor-agnostic. Such methods can be performed by software and/or incorporated into hardware and/or software based autonomous merit-based inertial navigation systems, which in turn can be deployed in vehicles to effect autonomous navigation solutions.

26 Claims, 6 Drawing Sheets

AUTONOMOUS MERIT-BASED HEADING ALIGNMENT AND INITIALIZATION METHODS FOR INERTIAL NAVIGATION SYSTEMS, AND APPARATUSES AND SOFTWARE INCORPORATING SAME

RELATED APPLICATION DATA

This application claims the benefit of priority of U.S. Provisional Patent Application Ser. No. 62/640,923, filed Mar. 9, 2018, and titled "Autonomous Merit-Based Heading Alignment and Initialization Methods for Inertial Navigation Systems," which is incorporated by reference herein in its entirety.

FIELD OF THE INVENTION

The present invention generally relates to the field of inertial navigation. In particular, the present invention is directed to autonomous merit-based heading alignment and initialization methods for inertial navigation systems, and apparatuses and software incorporating same.

BACKGROUND

Heading, i.e., the direction a vehicle, such as an underwater vehicle, is pointing relative to a reference axis in the operating coordinate frame. Heading is most commonly used as the direction a vehicle is pointing on Earth relative to geographic North, the Earth's primary reference axis. Heading is a difficult system state to sense accurately. Heading is also the most vital state to understand, because all position calculations in a dead-reckoning navigation system rely on accurate heading. Further, all transforms required to convert body-frame sensor measurements to Earth-Frame measurements rely on heading.

Many modern navigation systems use 3-axis rate gyros to measure their rotation about their axes. These gyros are typically combined with 3-axis accelerometers to compose an Inertial Measurement Unit (IMU). An IMU is the most essential sensor in many navigation systems, because it does two primary things. First, the IMU very accurately measures rotational rates such that if a starting point is known, the rates can be integrated once with respect to time to determine an updated position. With the very low drift rates possible in even the most cost-effective gyro, an IMU provides a means to "keep" a heading if navigation system starts-off knowing the heading. Second, an IMU allows for accurate resolution of pitch and roll, the absolute rotation about the X and Y axis with respect to the Earth. With this information, body-frame sensor information can be transformed to Earth coordinates and an accurate orientation estimate with respect to Earth can be maintained.

Unfortunately, the initial heading has to be known for accurate navigation. The process of orienting a vehicle to the reference axis, referred to from here on as True North, initially and providing this information to the navigation system is generally referred to as "initialization" or "alignment," but these terms speak to two slightly different steps in the process of starting a navigation process. Alignment allows for the alignment of the navigation system and vehicle to True North. Alignment is typically spoken about in terms of "rough" alignment and "fine" alignment. There is no clear and absolute differentiation between rough and fine in this context, but these terms are understood well enough to mean the same thing universally. Rough alignment is when True North has been found "pretty accurately." This could be an alignment to within a degree or two, but there remains an unmodeled and unaccounted for error within the system that prevents absolute alignment. These errors could have any number of contributors, such as mechanical misalignment between aiding sensors, errors in aiding sensors, and/or simply inaccuracies in the alignment solution, among others. Fine alignment is the final stage of complete alignment to True North such that the remaining error is due only to the expected statistical variance of the contributing sensors. Initialization is the process of starting the navigation estimate process with alignment data.

Given the above, it is clear the crux of accurate navigation (assuming an appropriate sensor set is provided) is heading alignment and initialization. And, alignment and initialization does not only happen once in a navigation process. Because the gyro and other sensors in the navigation solution drift, realignment, and reinitialization must be performed often while navigating. Unfortunately, in many cases looking to a single sensor to provide a True North alignment is not possible. This process is also complicated further because many of the sensors used to either find True North or contribute to finding True North have significant operational considerations that contribute to their accuracy. These factors contribute significantly to the great difficulty in achieving a precise navigation solution in environments where accurate heading information is not available from a single sensor, such as in underwater navigation where global positioning signals from the GPS are not available.

SUMMARY OF THE DISCLOSURE

In one implementation, the present disclosure is directed to a method of automatically updating a heading alignment state for an inertial navigation system in parallel with a heading estimation process. The method includes executing an alignment-state estimation algorithm to determine an alignment state, the alignment-state estimation algorithm configured to utilize inertial measurement data and a figure of merit (FOM) for a heading observer selected from among a plurality of available heading observers to determine the alignment estimate; in parallel with the executing the alignment-state estimation algorithm, executing a run-time heading-state estimation algorithm so as to determine a heading-state estimate, wherein the run-time state estimation algorithm is configured to utilize the inertial measurement data and the alignment estimate to determine the heading-state estimate; and transmitting the heading-state estimate to the inertial navigation system.

In another implementation, the present disclosure is directed to a method of automatically performing merit-based heading alignment in an autonomous merit-based inertial navigation system that utilizes a plurality of sensors of differing types. The method includes receiving sensor data from each of the sensors; genericizing the sensor data from each of the sensors to create genericized sensor data for each of the sensors; and publishing the genericized sensor data of each of the sensors to a generic network to provide published genericized sensor data for use by an alignment-state system listening to the generic network for the published genericized sensor data, wherein the alignment-state system is configured to create a plurality of heading observations based on the published genericized data; generate a figure of merit (FOM) for each of the heading observations; and determine which heading observation to use to update an alignment based on the FOMs.

In still another implementation, the present disclosure is directed to a machine-readable storage medium containing machine-executable instructions configured to perform a method of automatically updating a heading alignment state for an inertial navigation system in parallel with a heading estimation process. The method includes executing an alignment-state estimation algorithm to determine an alignment state, the alignment-state estimation algorithm configured to utilize inertial measurement data and a figure of merit (FOM) for a heading observer selected from among a plurality of available heading observers to determine the alignment estimate; in parallel with the executing the alignment-state estimation algorithm, executing a run-time heading-state estimation algorithm so as to determine a heading-state estimate, wherein the run-time state estimation algorithm is configured to utilize the inertial measurement data and the alignment estimate to determine the heading-state estimate; and transmitting the heading-state estimate to the inertial navigation system.

In yet another implementation, the present disclosure is directed to a machine-readable storage medium of automatically performing merit-based heading alignment in an autonomous merit-based inertial navigation system that utilizes a plurality of sensors of differing types. The method includes receiving sensor data from each of the sensors; genericizing the sensor data from each of the sensors to create genericized sensor data for each of the sensors; and publishing the genericized sensor data of each of the sensors to a generic network to provide published genericized sensor data for use by an alignment-state system listening to the generic network for the published genericized sensor data, wherein the alignment-state system is configured to create a plurality of heading observations based on the published genericized data; generate a figure of merit (FOM) for each of the heading observations; and determine which heading observation to use to update an alignment based on the FOMs.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

1. General Overview

Figure 1:
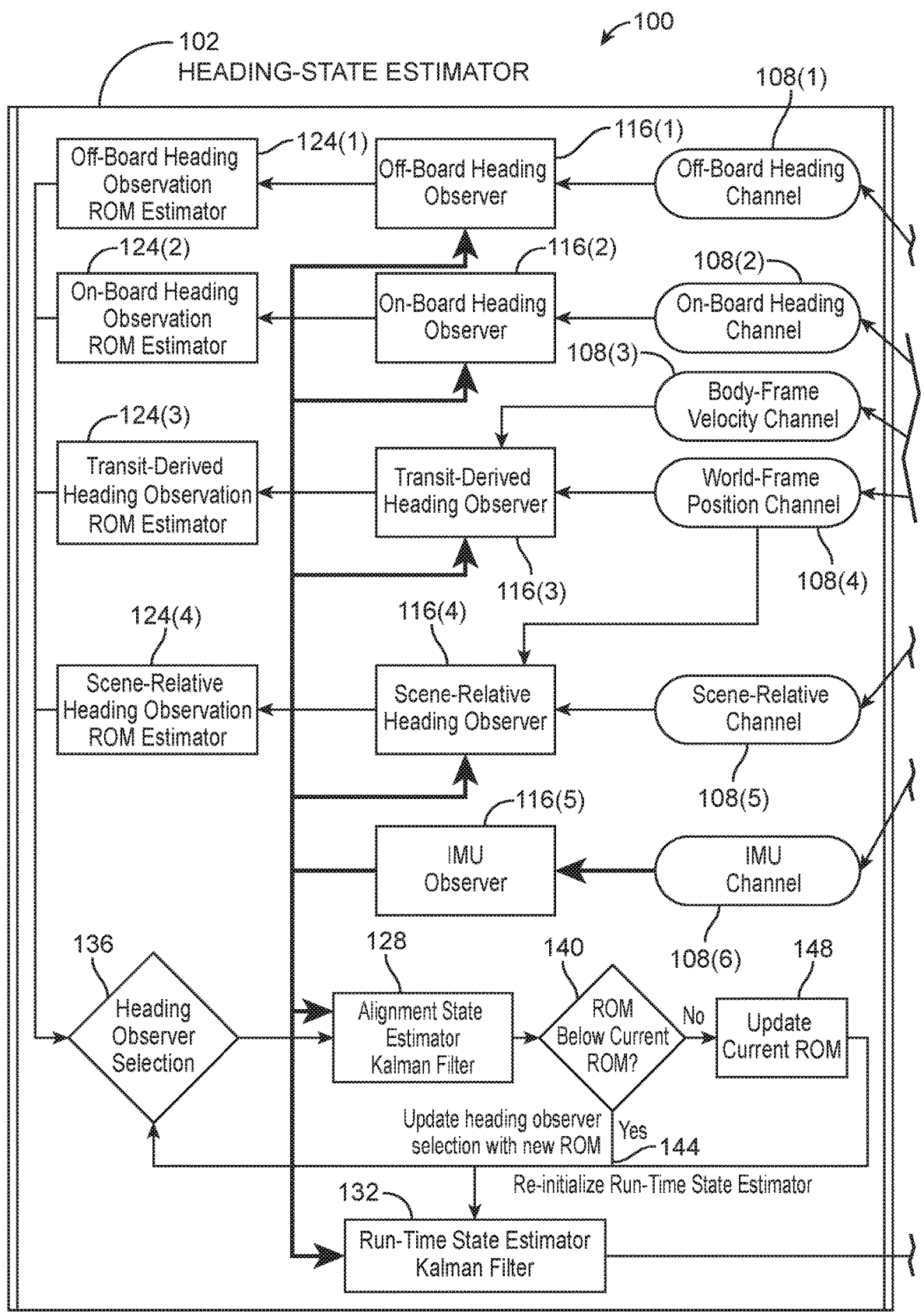
FIG. 1 is a functional diagram of an autonomous merit-based inertial navigation system made in accordance with the present disclosure.
Figure 1:
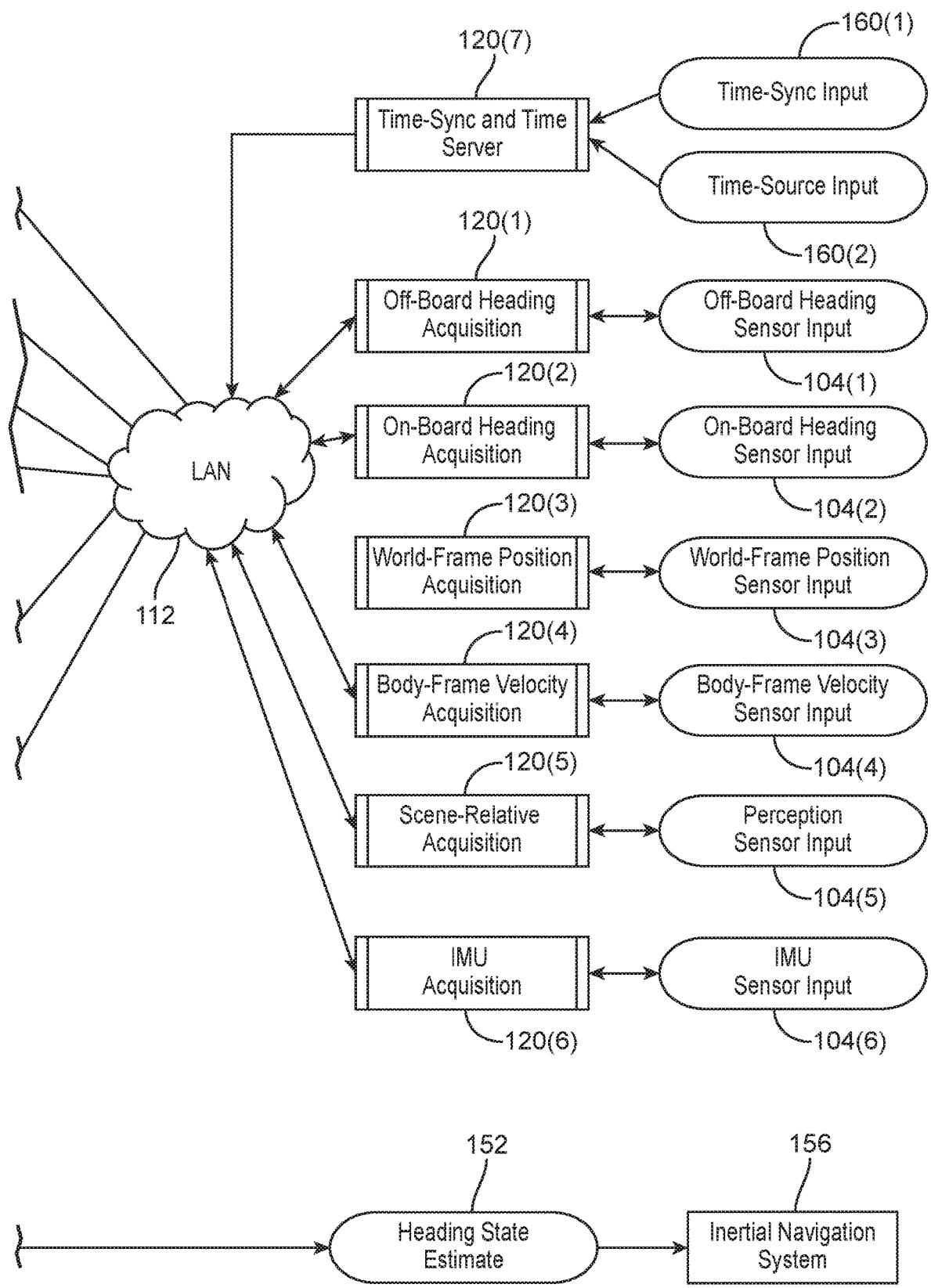

As noted in the Background section above, there is great difficulty in achieving precise navigation solutions in environments where accurate heading information is not available from a single sensor, such as in underwater navigation where global positioning system (GPS) signals are not available. In addition, sensors that may be available for navigation have a variety of operational issues that counsel against their use as sole sources of heading information. For example, magnetic sensors, such as a common compass, do not find True North. Rather, they find Magnetic North, and there are many factors that influence their performance. Because of these factors, they cannot be used for accurate and reliable navigation for a wide breadth of operational considerations.

There are sensors that can accurately align to True North. These True-North-seeking systems typically rely on technologies that size, weight, cost, and operational considerations that preclude their use on many platforms. These sensors also require they system to be stable during initialization, another factor excluding them from many operations.

GPS-based heading sensors, i.e., systems utilizing two antennas to orient a body's position, are accurate when there is suitable GPS coverage. Similarly, there are many other systems and sensors that may provide an accurate North orientation sometimes. There are also many other sensors that may provide an observation of some state that could contribute to determining orientation to True North.

While a one-size-fits-all solution to finding True North is not available in a single sensor, an aspect of the present disclosure is looking toward a system of sensors to help find True North. Aspects of the present disclosure also include methods that aid in utilizing a system of sensors in the broadest operational cases possible. In fact and as discussed herein, a system of sensors to find True North can be more feasible in many cases for smaller vehicle and mobile robotic applications than a single sensor.

Many vehicles operate in coordinate frames that are ad-hoc and not coupled to established frames of reference, such as the Earth. In these cases, no sensor exists to align the vehicle directly in the operating frame of reference without transferring heading observations from the Earth's frame through the operating frame based on estimations of the operating frame's orientation to Earth. A general purpose method of directly observing a vehicle's orientation within any operating frame is greatly desired.

Considering navigation typically brings to mind navigation within a frame with either (1) continuous updating of current position or (2) deriving a continuous update of one's current position with absolute state observations within the frame of reference. This is what the well-known Global Positioning System (GPS) does. In some cases, such as underwater, there is no absolute state observation, no GPS, and no alternative solutions. In this case, the only option is dead-reckoning. Navigation by dead-reckoning is the process of propagating a state estimate from a known pose, including position and orientation, given only time and velocity data (or other state observations that can be cast to velocity data). This is the most common means of navigation underwater.

To dead-reckon accurately, one must know the initial pose (position and orientation), have a good measurement of time, have a good measurement of velocity (both translational and rotational), and be able to provide a good estimate of orientation with respect to the frame in which navigation is occurring. This is typically call the "heading." "Heading," or rotational orientation within a frame of reference, is the most difficult and critical state to understand in a dead-reckoning systems. Heading must be known to apply the translational velocity data accurately. Thus, an overall navigation solution is really only as good as the heading estimate.

There are several sensors and methods available to measure specific orientation to Earth (i.e., conventional heading) very accurately. As an example, one can use a True-North seeking gyro or a dual-antenna GPS. These methods produce extremely reliable heading data. Unfortunately, these sensors and methods are expensive, both in terms of power and financial expense, size restrictive, and operationally restrictive for many mobile robot applications and often inapplicable to for use in underwater robotics. Additionally, these sensors continue to have operational modes that produce incorrect and inaccurate results. Even with the size, weight and power and cost (SWaP-C) budget to support many of the available True-North seeking heading sensors, it is very difficult to know when a sensor is providing correct results. Further, when operating in a frame of reference that is ad-hoc, arbitrary, or dynamic to the Earth, there is no general purpose method of observing heading.

For miniature mobile robotics and for many underwater applications requiring SWaP-C optimization, magnetic compassing is typically relied upon to find an initial heading and update the heading during operation. Magnetic compassing methods do not produce accurate and reliable results, nor are they applicable to implementations that do not use Earth as a reference frame. A new method is required that helps ensure the very best initial heading is used, is applicable to miniature and low-cost robotic applications, and is robust.

Aspects of the present invention are directed to methods and systems that monitor several channels of generic state observations to automatically provide the most accurate heading estimate possible for the immediate operating frame. These methods and systems are able to do this by determining the merit of each state observation as it relates to the alignment of the system within the operating frame. These systems and methods are dramatically different from conventional optimal state estimation processes in that they are highly flexible and completely agnostic of the actual sensors and processes used for the state observations that may contribute to the alignment estimate. Further, the disclosed methods provide direct observations of heading within the operating frame without the need for transfer alignment from the Earth frame.

A basis of methods disclosed herein is an inertial dead-reckoning (IDR) system for heading. This IDR system is based on first, initializing an optimal state estimation algorithm, second, propagating a heading estimate through the state estimation algorithm using measured gyroscopic rotational rates transformed to the reference frame that may or may not be aided by continuous heading observation, and then, re-initializing the state estimation algorithm when the estimated heading error exceeds an allowable threshold. Methods of the present disclosure complement this IDR method to address five primary challenges in small mobile robotics in which size, weight, power, and cost (SWaP-C) constraints preclude the use of other heading estimation processes. These challenges are: (1) knowledge of the heading data used to initialize or aid the heading estimate; (2) the quality of the heading used to initialize the heading; (3) the quality of the heading used to aid the gyro-time propagation; (4) the quality and determination of the re-initialization sequence; and (5) the processing power and computational complexity associated with providing for these considerations through current state-of-the-art methods. Further, methods disclosed herein work in any reference frame as long as observations relating the mobile robot to the reference frame are available.

In some embodiments, an autonomous merit-based inertial navigation system of the present disclosure uses two optimal state estimation processes in parallel: a heading estimate using gyro-time propagation with or without an aiding source, and an alignment estimate that can be used to reinitialize or correct the heading estimate when a high-confidence alignment is determined from any of a number of observation channels. The alignment estimate computes a figure of merit (FOM) associated with any possible alignment derived from available state observations. When the alignment estimate finds an alignment with a FOM lower than the current FOM associated to the heading estimate, the autonomous merit-based inertial navigation system uses that alignment estimate to initialize, or re-initialize, the heading estimate. The autonomous merit-based inertial navigation system can then use that alignment estimate to aid the heading estimate for correcting drift.

In some embodiments, the alignment estimate uses alignment observations derived from five possible state observation channels: two heading observations, one position observation, one velocity observation, and one scene-relative observation. Those skilled in the art will understand that the number of possible state observation channel can be more or fewer than five. In this example, the autonomous merit-based inertial navigation system produces state observations on these state observation channels by translating specific sensor data to generic state data. These state observation channels can be implemented as generic observation, for example, using user datagram protocol (UDP) datagrams or other suitable protocol on a communication network, such as a local area network (LAN), that are published by independent software device drivers configured for the particular hardware and software protocols required for the actual sensor. Each observation provides state data as well as an estimated quality metric for the state data. In this example, the autonomous merit-based inertial navigation system makes no requirement for the observations and requires no knowledge of the actual sensor after the data is physically extracted from the sensor and genericized to the observation datagram format.

The autonomous merit-based inertial navigation system works to make an alignment estimate by fusing the observation data with the inertial data through an optimal state estimation filter. There are various modes of this estimation process defined by what state observations are available. The following Table provides a few examples of how data from the state observer channels can contribute to alignment estimates on those channels. The autonomous merit-based inertial navigation system may select a particular observation source to use for the alignment estimate or it may use several observation sources depending on the system configuration. Typically though, the various state observers are configured to span a broad operational range collectively and are not typically available simultaneously.

| Estimate | Inertial Gyro rates | Inertial Accels | Orientation Observer A | Orientation Observer B | Position Observer | Velocity Observer | Scene Observer |
|---|---|---|---|---|---|---|---|
| Orientation | X | | X | | | | |
| Orientation | X | | X | | | | |
| Orientation | X | | X | X | | | |
| Transit Alignment | X | X | | | X | X | |
| Transit Alignment | X | X | | | X | | |
| Scene-relative | X | X | | | | | X |
| Scene-relative | X | X | | | | X | X |

Once an alignment observation is available, the alignment estimation process can run. As the alignment estimation process runs, it produces a FOM describing its confidence in the alignment. Once a FOM is realized that is lower than the FOM of the last alignment used to initialize and correct the heading estimation process, the alignment is passed to the heading estimation process to re-alignment.

The FOM may be calculated based on statistical stability as well as from input parameters related to the observation channel. In this manner, the merit-based approach of the present disclosure overcomes many shortcomings related to state estimation processes that assume a homogeneous data source. Examples in section 3, below, illustrate the use of this.

Following are some examples of benefits that an autonomous merit-based inertial navigation system of the present disclosure can provide.

Sensor agnostic. In some embodiments each device driver (i.e., the software at the physical interface of the sensor), genericizes the sensor data to a generic state observation format that is provided to the rest of the architecture in, for example, a UDP datagram specified by observation type. The device driver is responsible for publishing the sensor data to an observation channel. The alignment process has no relationship with the actual sensor and can thus remain completely flexible and application agnostic.

End-point observation quality. In some embodiments each device driver is responsible for collecting or estimating the quality of the sensor and propagating this into a quality of the state observation. This quality may be provided by the sensor, provided through prior knowledge of the sensor, or derived by the device driver. In any case, the quality is normalized in the observation channel by the device driver.

Adaptable heading estimation based on availability and quality of observations. Based on a set of rules provided by a system designer, the autonomous merit-based inertial navigation system can dynamically provide a heading estimate using any state observation or any combination of state observations to achieve a heading observation with the highest quality possible. This rule-based approach of selection and combination differs from the traditional optimal estimation methods. Traditional methods generally estimate a state based on Gaussian random processes that rely on a set of rules to select and weight input observations dynamically to achieve a low-cost output estimate.

Merit based weighting of heading estimation. Based on the quality of the input observations, the statistical stability of the heading estimation, the state estimation filter error, and a possible set of rules, an autonomous merit-based inertial navigation system of the present disclosure assigns a FOM to the heading estimate each time it is calculated. The autonomous merit-based inertial navigation system uses this FOM to weight the heading estimate so that the autonomous merit-based inertial navigation system can understand how good the heading estimate is before it consumes it and, in turn, makes decisions on how to use it.

Rule-based merit calculations. An autonomous merit-based inertial navigation system of the present disclosure uses state observations, either independently or in combination with other state observations, filtered through a state estimation filter using inertial measurement data to produce a heading estimate. It then calculates a FOM for each heading estimate. The autonomous merit-based inertial navigation system can use a set of rules, provided by a system configurator, to help determine how the FOM is calculated for a particular heading estimate process. This set of rules may be based on knowledge of the particular sensor, operating environment, or any other factor that produces non-linear and non-random data with an error profile that is non-homogenous.

Parallel alignment and heading estimation processes. Conventional heading estimation methods typically use an optimal state estimation process, such as a Kalman filter, to estimate the heading based on an initial condition and input states from sensors such as an inertial measurement unit and heading sensors. The autonomous merit-based inertial navigation system disclosed herein modifies this conventional method to estimate heading using an optimal state estimation process (e.g., Kalman filter), based on the initial conditions provided by a merit-based alignment process running in parallel to the primary estimation process. The output of this merit-based alignment process is an alignment estimate with associated merit. This alignment estimate can be used to reinitialize the primary heading estimate, leaving the primary heading estimate to run in pure-inertial mode between initializations. The alignment estimate can also be used for continuous aiding, with known merit, when a suitable heading observation is continually available. This parallel architecture creates a separate process for constructing and managing the heading used to initialize and aid the primary heading estimation process. This allows the autonomous merit-based inertial navigation system to construct dynamically a heading observation from various sources using a set of rules based on the availability and quality of the sources and use that heading observation to align, reinitialize, and aid the parallel heading estimation process. Through this, the heading estimation process can continually improve as alignment estimates with better FOMs are realized.

Self-aware of current heading and navigational accuracy. Because an autonomous merit-based inertial navigation system of the present disclosure can estimate a FOM with each new heading alignment, the autonomous merit-based inertial navigation system can continuously know the accuracy of the heading estimate by "aging" the heading FOM with the known drift rate of the inertial process between alignments. This heading accuracy can also be used to estimate the dead-reckoning navigational accuracy.

Method of estimating current heading merit. In a dead-reckoning system, if the quality of the initial pose and the quality of the propagating forces are known, the quality of a dead-reckoning estimate can always be known. In the present autonomous merit-based inertial navigation system, the FOM associated with the alignment used for initializing the heading estimate provides the quality of the initial pose. This process implements a method of estimating continual heading quality by starting with the alignment FOM and penalizing it with known factors that negatively affect the heading dead-reckoning process, such as gyro bias, temperature-related gyro drift, and dynamics.

Frame independent. An alignment and heading estimation process of the present disclosure is entirely frame independent and operates completely agnostic of the coordinate frame. Since each device driver normalizes the observation data to a common frame, the actual alignment and estimation processes are agnostic to the operating frame.

Direct observation of heading within the operating frame. Using observations of the operating frame, the system produces an alignment estimate immediately relative to the operating coordinate frame from which the parallel heading estimation process can initialize without transforming the observation from another frame.

Allows for non-random, periodic, and switching external observations. A problem with traditional heading estimation processes is that they use optimal state estimation algorithms based on random input sources. These sources display Gaussian-type noise characteristics arriving at either continuous or well understood discrete update intervals. These traditional methods do not handle non-random, periodic, or switching external source data. The process presented herein compensates for non-random, periodic, and switching external input data through rules and dynamic reconfiguration to achieve the lowest FOM possible.

Use of normalized two-dimensional (2D) scene observations to estimate heading. In some embodiments normalized 2D scene observation can be used to estimate heading. This process may use a numerical matrix of returned energy amplitude over a geographical region to describe a scene in front of the mobile apparatus. This data is typically derived from scan sensors such as radar, sonar, or laser line scan. An autonomous merit-based inertial navigation system of the present disclosure extracts "features" from this 2D scene to create a map of features. By correlating features with known map data, the autonomous merit-based inertial navigation system can estimate a scene-relative heading estimate.

Use of 2D scene observations to estimate heading change. Utilizing 2D scene observations to estimate heading change can use a numerical matrix of returned energy amplitude over a geographical region to describe a scene in front of the mobile apparatus. This data is typically derived from scan sensors such as radar, sonar, or laser line scan. An autonomous merit-based inertial navigation system of the present disclosure can extract "features" from this 2D scene to create a map of features. By correlating features from one scan to another, the autonomous merit-based inertial navigation system can estimate a heading change.

Use of merit rules to compensate for magnetic compass error. By testing a magnetic compass against a known "good" control source, the relationship of the magnetic compass to True North can be determined. With this information, accuracy of compass output can be understood and a rule can be generated that describes the merit of the compass as a function of its heading. This merit rule can then be used to derive a compensation formula for the compass achieving a desired FOM at any heading.

Heading estimation using observations from multiple frames. Since each sensor driver is responsible for publishing normalized observation data, raw sensor data from any frame is suitable to determine a heading observation in the desired frame.

Support for distributed observations and distributed computing. Since all sensor data can be normalized over a communication network, for example, via UDP datagrams specific to the observation type, an autonomous merit-based inertial navigation system of the present disclosure can support a fully distributed architecture. In a system having such a distributed architecture, the sensor interfaces can be remote from the core estimation process and deployed on independent processors. This enables the construction and implementation of wide area observers not within the actual robot. It also enables the building and construction of a navigation system by simply adding sensors that publish observation data on the communication network.

Fully automatic with support for manual intervention. In some embodiments, the alignment and estimation method is a fully automatic process but can provide support for manual intervention. Operators may command the system to attempt to realign, to weight FOM estimates artificially, to disable or enable observation sources, and/or to provide a manual alignment estimate with a manual FOM.

Support for disabling or enabling observation sources. Because an autonomous merit-based inertial navigation system of the present disclosure strives to produce the best possible alignment estimate based on the availability and quality of current observation sources, observation sources may be removed or added in real-time. As observation sources are made available, or removed from the framework, the autonomous merit-based inertial navigation system will reconfigure to provide the most optimal alignment estimate.

Redundant heading observation. As an autonomous merit-based inertial navigation system of the present disclosure strives to produce the best possible alignment estimate based on the availability and quality of current observation sources, it has a native redundancy. This allows it to reconfigure and still provide an alignment estimate if one source fails.

User reconfigurable estimation method. As an autonomous merit-based inertial navigation system of the present disclosure strives to produce the best possible alignment estimate based on the availability and quality of current observation sources, it allows the possibility for manual intervention over observation sources. Therefore, an assigned supervisor could turn on or off observation sources based on knowledge of operational conditions or availability of new sources.

Support for real-time sensor switching. An autonomous merit-based inertial navigation system strives to produce the best possible alignment estimate based on the availability and quality of current observation sources. Therefore, the autonomous merit-based inertial navigation system allows the possibility of switching sensors in real-time. This allows the autonomous merit-based inertial navigation system to switch sensors out on a particular observation channel or replace a failing sensor with another.

Merit rule generation and merit learning for heading observations. If a user is able to produce a heading estimate from an alignment with a good FOM, an autonomous merit-based inertial navigation system of the present disclosure can help the user generate online rules for calculating a FOM for the two heading observation channels by learning their relationship with a known good heading. With an established FOM, the autonomous merit-based inertial navigation system can also compensate for the heading observations.

Real-time merit-based alignment and initialization. An autonomous merit-based inertial navigation system of the present disclosure strives to produce the highest quality heading estimate possible from direct state observations in order to align the inertial heading estimate. As the autonomous merit-based inertial navigation system produces an observation-based heading estimate with a higher-quality (i.e., lower) FOM than the one previously used to initialize the dead-reckoning heading estimate, it will re-initialize the dead-reckoning heading estimate with this new alignment.

Estimation and compensation of physical sensor misalignment. Once a high-quality heading estimate is achieved from an observation-based alignment with a low FOM, an autonomous merit-based inertial navigation system of the present disclosure can use that heading to identify static biases in observation channels. The autonomous merit-based inertial navigation system can compensate for these static biases as they are likely physical sensor offsets.

Estimation of local magnetic declination and deviation. Once a high-quality heading estimate is achieved from an observation-based alignment with a low FOM, an autonomous merit-based inertial navigation system of the present disclosure can use that heading to identify the declination and deviation of the magnetic compass sensor if configured as an observation source.

On-line calibration of magnetic compass. Once a high-quality heading estimate is achieved from an observation-based alignment with a low FOM, an autonomous merit-based inertial navigation system of the present disclosure can use that heading to develop a look-up table of compensation values to calibrate a magnetic compass used on a heading observation channel.

Method of closed-loop heading alignment process for mobile apparatus. Using the estimated FOM for alignment and the basic rules assigned to a particular heading derivation process, an autonomous merit-based inertial navigation system of the present disclosure can implement a closed-loop method for achieving a low FOM easily using basic classical control techniques.

Method of diagnostics and development support by recording and playing back observation network data. Since all sensor inputs may be normalized and then published by their respective software device drivers on the network, for example, via UDP datagrams, an autonomous merit-based inertial navigation system of the present disclosure can log the data traffic. An alignment and heading estimation process of the present disclosure can contain synchronization methods to support played back data traffic to support post processing, diagnostics, and development in "real time" using logged data.

2. Example Autonomous Merit-Based Inertial Navigation System 2.1 System Overview FIG. 1 illustrates an example autonomous merit-based inertial navigation system 100 made in accordance with the present disclosure. In this example, autonomous merit-based inertial navigation system 100 includes a merit-based heading-state estimator 102 that performs an automatic alignment and initialization method utilizing data from a wide variety of sensors (not shown) in the form of sensor inputs. In this example, such sensor inputs include an offboard heading sensor input 104(1), an onboard heading sensor input 104(2), a world-frame position sensor input 104(3), a body-frame velocity sensor input 104(4), a perception sensor input 104(5), and an IMU sensor input 104(6), without any specific knowledge of the sensors. Autonomous merit-based inertial navigation system 100 enables a highly configurable sensor system that may be distributed widely interior and/or exterior to a vehicle, such as vehicle 408 of FIG. 4. Autonomous merit-based inertial navigation system 100 allows automatic alignment and initialization based on operational conditions with no intervention required from a host platform or operator.

In this example, there are six input channels to autonomous merit-based inertial navigation system 100, namely and offboard heading channel 108(1), an onboard heading channel 108(2), a body-frame velocity channel 108(3), a world-frame position channel 108(4), a scene-relative 108(5), and an IMU channel 108(6). Each input channel 108(1) to 108(6) listens to a communication network 112, such as a LAN, for datagrams intended for that specific channel. The datagrams are generic messages containing the minimum data needed for each sensor input 104(1) to 104(6). All data in each message has been normalized, transformed, and scaled to the units and coordinate frame adopted for autonomous merit-based inertial navigation system 100. Follow are brief descriptions of an example input sources for the six input channels 108(1) to 108(6) used in this example.

Offboard Heading Channel 108(1). Heading data from a source external to the vehicle or core sensor suite. Example: GPS.

Onboard Heading Channel 108(2). Heading data from a source internal to the vehicle frame and core sensor suite. Example: Compass.

Body-Frame Velocity Channel 108(3). Velocity data for the body-frame. Example: Doppler Velocity Log (DVL).

World-Frame Position Channel 108(4). Position data for the vehicle on the Earth. Example: GPS.

Scene-Relative Channel 108(5). Feature data describing any physical features perceived to be near the vehicle or within the vehicle's scene. Example: Sonar features.

IMU Channel 108(6). Inertial data consisting of 3 axis rotational rates and 3 axis acceleration. Example: Fiber-Optic Gyro.

In this example, autonomous merit-based inertial navigation system 100 can produce up to four observations of the heading alignment state, or just "heading state," using up to six received data messages on dedicated input channels 108(1) to 108(6), corresponding to normalized sensor inputs 104(1) to 104(6), respectively. Each heading observation provides a state estimate of the vehicle's heading based on the available channel input. In this example, autonomous merit-based inertial navigation system 100 has four heading observers, namely, an offboard heading observer 116(1), an onboard heading observer 116(2), a transit-derived heading observer 116(3), and a scene-relative heading observer 116(4). Each heading observer 116(1) to 116(4) has a specific computational scope and may be described as follows. Also in this example, autonomous merit-based inertial navigation system 100 has a IMU observer 116(5) that acquires IMU sensor data published by IMU acquisition application 120 (6). As described below, the IMU sensor data may be utilized by heading observers 116(1) to 116(4) and other components of autonomous merit-based inertial navigation system 100.

Offboard Heading Observer 116(1). Offboard heading observer 116(1) typically reflects the exact sensor status as acquired from offboard heading channel 108(1). Offboard heading observer 116(1) may be configured to filter data from offboard heading channel 108(1) through a variety of filters (not shown) such as a simple moving average filter, a frequency-based filter, or a type of optimal state-estimation filter, such as a Kalman or Extended Kalman Filter using the IMU state as a process input as available via IMU observer 116(5).

Onboard Heading Observer 116(2). Onboard heading observer 116(2) typically reflects the exact sensor status as acquired from onboard heading channel 108(2). Onboard heading observer 116(2) may be configured to filter the input channel data through a variety of filters (not shown), such as a simple moving average filter, a frequency-based filter, or a type of optimal state-estimation filter, such as a Kalman or Extended Kalman Filter using the IMU state as a process input as available from IMU observer 116(5).

Transit-Derived Heading Observer 116(3). Transit-derived heading observer 116(3) estimates the vehicle heading by comparing the path measured by world-frame position sensor input 104(3) and the path estimated by body-frame state inputs (velocities and accelerations) as obtained or derived from world-frame position sensor input 104(3) and body-frame velocity sensor input 104(4) on world-frame position channel 108(4) and body-frame velocity channel 108(3), respectively. The transform between these two paths results in an alignment estimate for autonomous merit-based inertial navigation system 100. Transit-derived heading observer 116(3) computes the world-frame path typically based only on the data on world-frame position channel 108(4), though some filter (not shown) may be used to smooth or interpolate the data. Transit-derived heading observer 120(3) estimates the body-frame path through an optimal state estimation filter, such as a Kalman or Extended Kalman Filter, by fusing body-frame velocities and body-frame accelerations. IMU observer 116(5) provides the IMU-state accelerations and rotational velocities used by the state-estimation filter that is estimating the parallel alignment and estimation solutions.

Scene-Relative Heading Observer 116(4). Scene-relative heading observer 116(4) estimates the vehicle heading by constructing a scene based on the features provided from scene-relative channel 108(5) and the vehicle's world-frame position provided by world-frame channel 108(4). The transform of this scene to known map-objects provides a heading estimate. Scene-relative heading observer 120(4) may use several filtering or estimation processes to construct the scene based on the extracted features and body-frame state. IMU observer 116(5) provides the IMU-state accelerations and rotational velocities that are being used by the scene observer to stabilize the scene-relative estimates.

Autonomous merit-based inertial navigation system 100 operates fully asynchronously, allowing sensor inputs 104 (1) to 104(6) to arrive as they are published from corresponding respective sensor acquisition applications, namely, an offboard heading acquisition application 120(1), an onboard heading acquisition application 120(2), a world-frame position acquisition application 120(3), a body-frame velocity acquisition application 120(4), a scene-relative acquisition application 120(5), and an IMU acquisition application 120(6). Autonomous merit-based inertial navigation system 100 may utilize a shared memory system (not shown) to store data received from input channels 108(1) to 108(6) until it is required for computation. In this example, IMU channel 108(6) controls the scheduling of the calculation processes, however. Once IMU Channel 108 receives IMU sensor input 104(6) from an IMU (not shown), it forces each observer 116(1) to 116(6) to calculate a current observation of heading, executes an alignment estimate, and executes a run-time heading estimate. As all data is time-stamped, each observer 116(1) to 116(4) and corresponding FOM estimator 124(1) to 124(4) can accommodate for the asynchronous arrival of data by propagating its estimation process accordingly.

Autonomous merit-based inertial navigation system 100 uses the heading observation with the greatest merit to formulate an alignment estimate to True North. As this alignment estimate improves, autonomous merit-based inertial navigation system 100 initializes the run-time heading state estimate with the new alignment value. In this manner, autonomous merit-based inertial navigation system 100 provides a fully automated alignment method that seeks to always improve based on merit.

Autonomous merit-based inertial navigation system 100 selects the heading observation to use by calculating a FOM that reflects the accuracy and stability of the observation. In this example, these FOMs are estimated by FOM estimators 124(1) to 124(4), here, an offboard heading observation FOM estimator 124(1), an onboard heading observation FOM estimator 124(2), a transit-derived heading observation FOM estimator 124(3), and a scene-relative heading observation FOM estimator 124(4). The FOM for each observation is based on the statistical stability of the observation as well as any known or reported accuracies of the observation sensor source. The accuracies may, for example, be reported by the sensors themselves or input as general knowledge through a configuration setting at application run-time. The FOM may also be weighted for each observation to provide a priority ranking for each observation channel 108(1) to 108(5) based on a programmed confidence.

Figure 2:
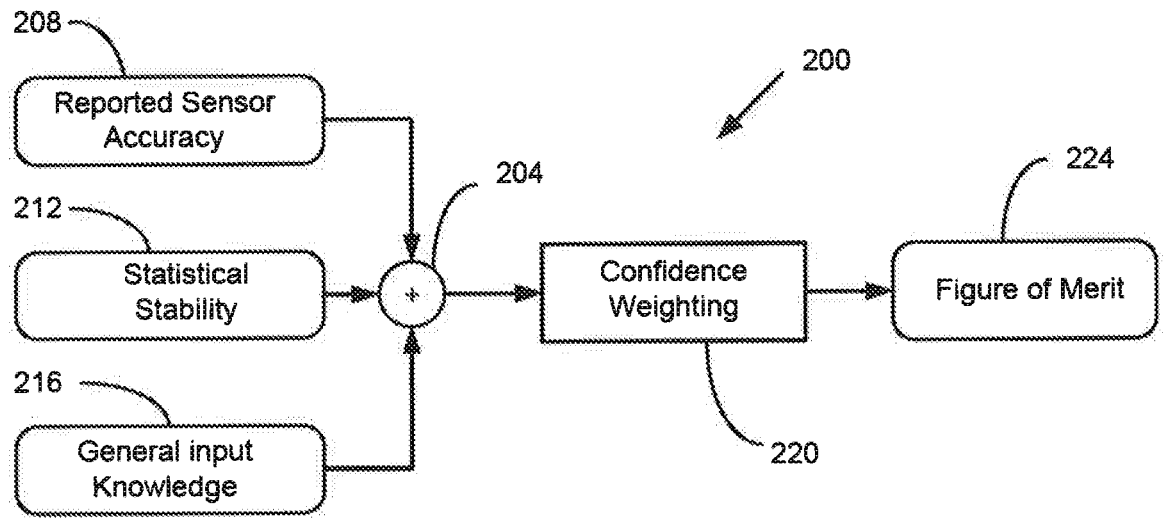
FIG. 2 is a diagram illustrating an example process of determining a figure of merit for a heading observation for use in a process of reinitializing a heading alignment state of an autonomous merit-based inertial navigation system, such as the autonomous merit-based inertial navigation system of FIG. 1.

FOM estimators 124(1) to 124(4) calculate a FOM for each observation by considering any reported accuracies by the input sensor, the statistical stability of the observation, general knowledge of the observation as provided in a configuration setting, and a confidence weighting factor over the observation. The FOM calculations normalize all of these factors to produce a FOM that is consistent in meaning across all observations and corresponds to an estimated possible error (e.g., root-mean-square (RMS) degrees) of the observation. FIG. 2 graphically illustrates an example process 200 of calculating each FOM. As seen in FIG. 2, the calculation of a FOM may include summing, at a summation node 204, a reported sensor accuracy 208 with a statistical stability 212 and general input knowledge 216, and applying confidence weighting 220 to the summation to arrive at a FOM 224. Some non-limiting examples of typical FOM calculations based on FIG. 2 for each sensor are provided below. Although not illustrated in FIG. 2, a covariance input from a state estimation process can be input to summation node 204 and used if available. In some embodiments, the scene-relative pose estimation, transit alignment, and internal alignment processes may include a filter attached providing covariance.

Offboard Heading Observation. Sensor: GPS.
Reported Sensor Accuracy. Based on Horizontal Dilution of Position (HDOP) for the GPS.
Statistical Stability. Standard Deviation of observation over a configurable size circular buffer.
General Input Knowledge. Not used.
Confidence Weighting. 1.0. High confidence.

Onboard Heading Observation. Sensor: Magnetic compass.
 Reported Sensor Accuracy. Not used.
 Statistical Stability. Standard Deviation of observation over a configurable size circular buffer.
 General Input Knowledge. A compass may be known and verified to have one or two points of near-zero degree error across the entire compass range, 0-360 degrees. The error relative to these zero-error points may also be known. The system is provided the zero-error points and the formula describing the compass error between the zero-error points.
 Confidence weighting. 1.5. Low confidence.
Transit-Derived Heading Observer. Sensors: GPS and DVL.
 Reported Sensor Accuracy. GPS HDOP and DVL bottom lock (Boolean).
 Statistical Stability. Standard Deviation of observation over a configurable size circular buffer.
 General Input Knowledge. The accuracy of the DVL is typically of function of velocity and this is known based on the specific sensor. This is provided as a scaling factor based on velocity.
 Confidence weighting. 1.0. High confidence.
Scene-Relative Heading Observer. Sensors: Multi-beam imaging sonar and GPS.
 Reported Sensor Accuracy. GPS HDOP and derived feature confidence.
 Statistical Stability. Standard Deviation of observation over a configurable size circular buffer.
 General Input Knowledge. Each map item specified will have an estimated accuracy of the map coordinates.
 Confidence weighting. 1.2. Good confidence.

Typically and referring again to FIG. 100, autonomous merit-based inertial navigation system 100 selects which heading observation to use for alignment based on FOM. In some embodiments, an operator can have manual control over this process by turning off one or more of observation channels 108(1) to 108(6) in the selection process. If a channel 108(1) to 108(6) is turned off, the corresponding FOM estimator 124(1) to 124(4) still calculates FOM, but it is excluded from consideration for alignment. Through this process, an operator can select a desired one of observation channels 108(1) to 108(6) to use for alignment by turning off all of the other channels.

In this example, autonomous merit-based inertial navigation system 100 includes an alignment state estimator 128 and a run-time state estimator 132 that each comprise a state estimation filter that is typically, though not necessarily, a Kalman Filter or Extended Kalman Filter. Alignment state estimator 128 and a run-time state estimator 132 simultaneously estimate alignment (alignment state estimator) and estimate a run-time heading solution (run-time state estimator). Alignment state estimator 128 fuses the selected heading observation with gyro rates available via IMU observer 116(5) to provide an accurate high-rate alignment estimate. Run-time state estimator 132 also fuses the heading observation with gyro rates available via IMU observer 116(5), but its filter will typically be configured to heavily weight the gyro rates or completely exclude the heading observation and run in pure inertial mode.

When autonomous merit-based inertial navigation system 100 starts, it initializes run-time state estimator 132 with the heading estimated by alignment state estimator 128, regardless of the estimated FOM. This heading has a FOM associated with it based on the FOM from the selected one of heading observers 116(1) to 116(4) selected at a heading observer selector 136. The FOM of the heading value that autonomous merit-based inertial navigation system 100 uses to initialize run-time state estimator 132 is referred to as the "Current FOM" in FIG. 100. As alignment state estimator 128 produces a heading estimate with a FOM better, here, lower, than the Current FOM as determined at an FOM comparator 140, the corresponding heading is used at path 144 to re-initialize run-time state estimator 132 and the FOM of that heading becomes the Current Heading FOM and fed back to heading observer selector 136. If, however, the FOM that alignment state estimator 128 produces is not lower than the Current FOM, then at block 148 the Current FOM is updated and fed back to heading observer selector 136. Each iteration of run-time state estimator 132 outputs a heading state estimate, as indicated at block 152, which may be provided to an inertial navigation system 156 of the vehicle.

Inertial navigation system 156 may be any suitable inertial navigation system that allows for updating of its navigation and control algorithms by heading state estimate 152. Those skilled in the art will understand how to implement inertial navigation system 156 without undue experimentation using ordinary skill in the art and without undue experimentation. Therefore, further description of inertial navigation system 156 in this disclosure is not necessary for those skilled in the art to understand the scope of the disclosure and to practice the inventions described herein to their fullest scope.

The Current Heading FOM is not static. As autonomous merit-based inertial navigation system 100 seeks to always better its heading, it has to consider any factor that would degrade its current heading estimate. In an inertial system, there are two main contributors to heading estimate inaccuracies: (1) time-based drift due to gyro bias and (2) dynamics that exceed the capabilities of the IMU to accurately measure. Thus, the Current Heading FOM is penalized by time and by high dynamics. Both of these factors can be input into autonomous merit-based inertial navigation system 100 prior to run-time as a configuration item and are typically based simply on the published specifications of the IMU used. This penalization of the Current Heading FOM allows autonomous merit-based inertial navigation system 100 to reinitialize if an alignment estimation is made that is better than the assumed run-time heading estimate is using.

Through this process of continuously realigning autonomous merit-based inertial navigation system 100 using a single heading observation based on the merit of various heading observations, the autonomous merit-based inertial navigation system is able to rough align and fine align autonomously, with no intervention from any operator or other source.

The below sections describe components of autonomous merit-based inertial navigation system 100 across communication network 112.

2.2 Inputs

Raw data inputs 104(1) to 104(6) come from independent sensors (not shown). These sensors typically communicate over a standard computer interface such as, but not limited to, RS232, RS485, RS422, User Datagram Protocol (UDP), Transmission Control Protocol/Internet Protocol (TCP/IP), Controller Area Network (CAN), or discrete (analog/digital). Autonomous merit-based inertial navigation system 100 is not specific to any particular sensors and can be adapted to most any common sensors of the appropriate types. Follow are descriptions of sensor inputs 104(1) to 104(6) and other inputs of autonomous merit-based inertial navigation system 100.

Offboard Heading Sensor Input 104(1). This is a generic input channel for any sensor external from the vehicle frame that provides heading information. The sensor may or may not provide suspected accuracy information but will at a minimum provide a heading value referenced to the world frame. Examples: GPS-based heading, launch vehicle heading with alignment data.

Onboard Heading Sensor Input 104(2). This is a generic input channel for any sensor internal to the vehicle frame that provides heading information. The sensor may or may not provide suspected accuracy information but will at a minimum provide a heading value referenced to the world frame. Examples: Magnetic compass.

World-Frame Position Sensor Input 104(3). This is a generic input channel for any sensor providing world frame position data. The sensor provides indication of position accuracy, as well as X and Y coordinates within the World Frame. Examples: GPS, Ultra-short Baseline, Long-Baseline.

Body-Frame Velocity Sensor Input 104(4). This is a generic input channel for any sensor providing body-frame velocity data. The sensor may or may not provide suspected accuracy information, and it provides X and Y velocity sensor data. Examples: DVL, Odometer, IR speed sensor.

Perception Sensor Input 104(5). This is a generic input channel for any 2D perception sensor capable of range-based imaging around the vehicle. The sensor provides scan-line data with range and bearing of return intensities or complete image data of features around vehicle. Examples: SONAR, RADAR.

IMU Sensor Input 104(6). This is a generic input channel for any inertial measure sensor. The sensor provides 3-axis acceleration (X,Y,Z) and 3-axis rotational rate ($\varphi$, $\theta$, $\psi$) data. Examples: Ring Laser Gyro (RLG), Fiber Optic Gyro (FOG), microelectromechanical system (MEMS) IMU.

Time-Source Input 160(1). Generic time source. Provides system time. Examples: GPS clock, Network Time Protocol Source.

Time-Sync Input 160(2). Standard Pulse-Per-Second (PPS) input. Provides a single Transistor-Transistor Logic (TTL)-level pulse every second to synchronize the time server and prevent drift. Time sync PPS may be distributed to all processing hardware to provide low-latency Central Processing Unit (CPU) clock synchronization. Examples: PPS from GPS receiver.

Both time source input 160(1) and time-sync input 160(2) may be acquired and published to communication network 112 by a suitable acquisition application 120(7).

2.3 Acquisition Applications

Each sensor (not shown) has a dedicated acquisition software application 120(1) to 120(6) for acquiring corresponding sensor input 104(1) to 104(6). Acquisition software applications 120(1) to 120(6) may be stand-alone software applications that can be configured, for example, through startup arguments or a configuration file for the specific sensor from which it will be acquiring sensor input 104(1) to 104(6). The role of acquisition software application 120(1) to 120(6) is to communicate with the sensors (bi-directionally as required) to acquire sensor input 104(1) to 104(6). Once software applications 120(1) to 120(6) have acquired the data of sensor input 104(1) to 104(6), they may publish data in a standard format, such as UDP, for the specific data type on a specified channel for receipt by a subscriber.

This stand-alone architecture lends itself to distributed systems whereby an acquisition system could be distributed across multiple processors. It can also just as easily (and perhaps more commonly) be deployed on a single processor with the subscriber.

Time-sync input 152(2) and Time Server 156. Time-sync input 152(2) and a time server 156 provide time synchronization and time serving for autonomous merit-based inertial navigation system 100. Typically, there is only one of these applications in an autonomous merit-based inertial navigation system of the present disclosure, such as autonomous merit-based inertial navigation system 100, and it provides a time source to all applications within autonomous merit-based inertial navigation system through an appropriate network protocol. As extremely low latency time synchronization is required for accurate navigation, the PPS (time-sync) signal is typically distributed to any processing hardware within autonomous merit-based inertial navigation system 100. Time server 156 provides a network time synchronization output for all other processing nodes to subscribe to.

Offboard Heading Acquisition Application 120(1). Offboard heading acquisition application 120(1) receives heading data from a heading sensor that is external to the vehicle and provides it to subscribing clients over LAN 112. The sensor may be, for example, a GPS attached to the vehicle for initialization purposes, an external alignment mechanism, or a reference to another body-frame. This data may be in TRUE or Magnetic coordinates but provides an estimate of the vehicle's heading from an external source.

Offboard heading acquisition application 120(1) may be configured at run-time for the input sensor type, data format, and interface protocol. Offboard heading acquisition application 120(1) is typically configured via start-up arguments or with a path to configuration file specifying the configuration. Depending on sensor type and sensor requirements, offboard heading acquisition application 120(1) may have to configure the sensor, poll the sensor for data, or simply listen for data. Once data is received, the acquisition application packages the minimum required data into a standard message type for heading data (Minimum Heading Pose data type) and may package any extraneous information specific to the particular sensor into another message type with data specific just to that sensor. Offboard heading acquisition application 120(1) publishes the received minimum data on offboard heading channel 108(1) and publishes sensor specific data on a configured channel, if required.

The most common configuration of offboard heading acquisition application 120(1) is to support a standard GPS-based heading sensor or other sensor providing the same or similar data output. In this configuration and in an example, the offboard heading acquisition application 120(1) may be configured to communicate on a local a serial (e.g., RS232, RS422, RS485) port set to 4800 Baud, 8 data bits, no parity, and 1 stop bit and will listen for "**HDT" (Heading from True North) sentences as defined in the NMEA-0183 standard. It provides accuracy information based on the GPS's reported HDOP value.

Onboard Heading Acquisition Application 120(2). Onboard heading acquisition application 120(2) receives heading data from a heading sensor internal to the vehicle and provides it to subscribing clients in a generic format over communication network 112. The heading sensor may be a GPS-based heading source, a magnetic heading sensor, or any other sensor providing a heading estimate of the vehicle. This data may be in TRUE or Magnetic coordinates.

Onboard heading acquisition application 120(2) may be configured at run-time for the input sensor type, data format, and interface protocol. Onboard heading acquisition application 120(2) is typically configured via start-up arguments or with a path to configuration file specifying the configuration. Depending on sensor type and sensor requirements, the acquisition application may have to configure the sensor, poll the sensor for data, or simply listen for data. Once data is received, Onboard heading acquisition application 120(2) packages the minimum required data into a standard message type for heading data (Minimum Heading Pose data type) and may package any extraneous information specific to the particular sensor into another message type with data specific just to that sensor. The acquisition application publishes the received minimum data on onboard heading channel 108(2) and publishes sensor specific data on a configured channel, if required.

The most common configuration of onboard heading acquisition application 120(2) is to support a specific magnetic compass module. There is typically no "standard" sensor used, and the sensors tend to be highly proprietary to manufacturer. These sensors typically communicate over a serial (e.g., RS232, RS422, RS485) port though, so a typical configuration for this application is to support communications at serial settings specific to the sensor, supporting a message protocol specific to the sensor.

World-Frame Position Acquisition Application 120(3). World-frame position acquisition application 120(3) receives position data of the vehicle within the world-frame from an attached sensor and provides it in a generic format to subscribing clients. This data at least provides X and Y position data of the vehicle and accuracy estimate of that position. This data may be in a variety of units, but world-frame position acquisition application 120(3) is normalized by this application for general consumption within the sensor-agnostic framework of autonomous merit-based inertial navigation system 100.

World-frame position acquisition application 120(3) may be configured at run-time for the input sensor type, data format, and interface protocol. World-frame position acquisition application 120(3) is typically configured via start-up arguments or with a path to a configuration file specifying the configuration. Depending on sensor type and sensor requirements, world-frame position acquisition application 120(3) may have to configure the sensor, poll the sensor for data, or simply listen for data. Once data is received, world-frame position acquisition application 120(3) packages the minimum required data into a standard message type for position data (Minimum Position Pose data type) and may package any extraneous information specific to the particular sensor into another message type with data specific just to that sensor. World-frame position acquisition application 120(3) publishes the received minimum data on world-frame position channel 108(4) and publishes sensor specific data on a configured channel, if required.

In some embodiments, the most common configuration of world-frame position acquisition application 120(3) is a configuration that supports a GPS input. While there are many different types of GPS receivers, they tend to at least provide a common National Marine Electronics Association (NMEA) 0183 interface using the RS232 standard. This requires world-frame position acquisition application 120(3) to be configured to support a serial (e.g., RS232, RS422, RS485) interface with 4800 baud, 8 data bits, no parity, and 1 stop bit, and at least the "RMC" sentence specified by the NMEA 0183 protocol. Accuracy in this configuration is derived from the GPS's reported HDOP value.

Body-Frame Velocity Acquisition Application 120(4). Body-frame velocity acquisition application 120(4) receives velocity data from an attached sensor and provides it to subscribing clients on LAN 112. This velocity data describes the velocity of the body-frame in at least the X and Y coordinates and may be in a variety of units. Body-frame velocity acquisition application 120(4) normalizes the data to a common unit format.

Body-frame velocity acquisition application 120(4) may be configured at run-time for the input sensor type, data format, and interface protocol. Body-frame velocity acquisition application 120(4) is typically configured via start-up arguments or with a path to a configuration file specifying the configuration. Depending on sensor type and sensor requirements, body-frame velocity acquisition application 120(4) may have to configure the sensor, poll the sensor for data, or simply listen for data. Once data is received, body-frame velocity acquisition application 120(4) packages the minimum required data into a standard message type for position data (Minimum Body-Frame Velocity data type) and may package any extraneous information specific to the particular sensor into another message type with data specific just to that sensor. The acquisition application publishes the received minimum data on body-frame velocity channel 108(3) and publishes sensor specific data on a configured channel, if required.

A common configuration of body-frame velocity acquisition application 120(4) is a configuration that supports a DVL sensor on underwater vehicle applications. This sensor provides X and Y velocity data with respect to the seafloor or a water layer. In this implementation, body-frame velocity acquisition application 120(4) is configured to support the DVL interface on a serial (e.g., RS232, RS422, RS485) port configured for 115200 baud, 8 data bits, no parity, and 1 stop bit. There are some common message protocols for a DVL sensor but Body-frame velocity acquisition application 120 (4) would typically be told which specific manufacturer's proprietary interface it will use for communication. Body-frame velocity acquisition application 120(4) may provide a figure of accuracy if available from the sensor, but this is commonly interpolated from the known operational parameters of the sensor.

Scene-Relative Acquisition Application 120(5). In some embodiments, scene-relative acquisition application 120(5) receives 2D scan-line or imagery data from a perception sensor and constructs an image representing the scene local to the vehicle. Scene-relative acquisition application 120(5) extracts feature from this scene and provides the coordinates, within the body-frame, of those features to subscribing clients on communication network 112. These features describe the scene relative to the vehicle.

Scene-relative acquisition application 120(5) may be configured at run-time for the input sensor type, data format, and interface protocol. Scene-relative acquisition application 120(5) is typically configured via start-up arguments or with a path to a configuration file specifying the configuration. Depending on sensor type and sensor requirements, scene-relative acquisition application 120(5) may have to configure the sensor, poll the sensor for data, or simply listen for data. Once data is received, the acquisition application packages the minimum required data into a standard message type for position data (Minimum Scene-Relative data type) and may package any extraneous information specific to the particular sensor into another message type with data specific just to that sensor. Scene-relative acquisition application 120(5) publishes the received minimum data on the scene-relative channel 108(5) and publishes sensor specific data on a configured channel, if required.

A common implementation of scene-relative acquisition application 120(5) is to support a SONAR for underwater positioning. Scene-relative acquisition application 120(5) interfaces with the sonar to build an image of the scene around the vehicle, extracts features from that image, and provides the coordinates of those features to a subscribing client. Scene-relative acquisition application 120(5) is flexible to support any type of imaging sonar over any type of interface. A common configuration for the Scene-relative acquisition application 120(5) is a configuration that communicates with a proprietary data format from a SONAR over, for example, TCP-IP or UDP.

IMU Acquisition Application 120(6). IMU acquisition application 120(6) acquires acceleration and rotational rate data from an IMU and provides it to subscribing clients. This data describes the linear acceleration of the body and the rotational rate of the body along and about the three primary axes of the vehicle (X, Y, and Z). The rotational rate and acceleration data may be acquired in a variety of units, but IMU acquisition application 120(6) normalizes the data into a common format used by clients within the architecture.

IMU acquisition application 120(6) is configured at run-time for the input sensor type, data format, and interface protocol. IMU acquisition application 120(6) is typically configured via start-up arguments or with a path to a configuration file specifying the configuration. Depending on sensor type and sensor requirements, IMU acquisition application 120(6) may have to configure the sensor, poll the sensor for data, or simply listen for data. Once data is received, IMU acquisition application 120(6) packages the minimum required data into a standard message type for position data (Minimum IMU data type) and may package any extraneous information specific to the particular sensor into another message type with data specific just to that sensor. The acquisition application publishes the received minimum data on IMU channel 108(6) and publishes sensor specific data on a configured channel, if required.

A common configuration of IMU acquisition application 120(6) supports receiving data from an IMU over a serial (e.g., RS232, RS422, RS485) interface. There is not a common format for IMU sensors so the interface is specific to the particular sensor used. There is typically no accuracy figure provided by the IMU, but IMU acquisition application 120(6) may derive an accuracy figure based on known operational constraints of the sensor.

Common Data Types

The Common data types in this system provide at least the following information for each type.

| Minimum heading pose data type. | |
| --- | --- |
| Data | Format |
| Time of acquisition | 64bit unsigned integer |
| Heading value | 64bit double-precision floating point |
| Accuracy | 64bit double-precision floating point |
| Message sequence | 64bit unsigned integer |
| True heading | Boolean |

| Minimum position data type. | |
| --- | --- |
| Data | Format |
| Time of acquisition | 64bit unsigned integer |
| X Position (Longitude) | 64bit double-precision floating point |
| Y Position (Latitude) | 64bit double-precision floating point |
| Message sequence | 64bit unsigned integer |
| Accuracy | 64bit double-precision floating point |

| Minimum body-frame velocity data type. | |
| --- | --- |
| Data | Format |
| Time of acquisition | 64bit unsigned integer |
| Velocity in body-frame X direction | 64bit double-precision floating point |
| Velocity in body-frame Y direction | 64bit double-precision floating point |
| Message sequence | 64bit unsigned integer |
| Accuracy | 64bit double-precision floating point |

| Minimum scene-relative data type. | |
| --- | --- |
| Data | Format |
| Time of acquisition | 64bit unsigned integer |
| Number of features in scene | 64bit unsigned integer |
| Vector of features in scene | Vector of Minimum Scene Feature data types |
| Message sequence | 64bit unsigned integer |
| Accuracy, aggregate | 64bit double-precision floating point |

| Minimum scene-feature data type. | |
| --- | --- |
| Data | Format |
| Feature X position, body-frame | 64bit double-precision floating point |
| Feature Y position, body-frame | 64bit double-precision floating point |
| Feature area | 64bit double-precision floating point |
| Feature stability | 64bit double-precision floating point |
| Feature correlation probability | 64bit double-precision floating point |

| Minimum IMU data type. | |
| --- | --- |
| Data | Format |
| Time of acquisition | 64bit unsigned integer |
| X axis acceleration | 64bit double-precision floating point |
| Y axis acceleration | 64bit double-precision floating point |
| Z axis acceleration | 64bit double-precision floating point |
| $\varphi$ rotation rate | 64bit double-precision floating point |
| $\theta$ rotation rate | 64bit double-precision floating point |
| $\Psi$ rotation rate | 64bit double-precision floating point |
| Accuracy | 64bit double-precision floating point |

Figure 3A:
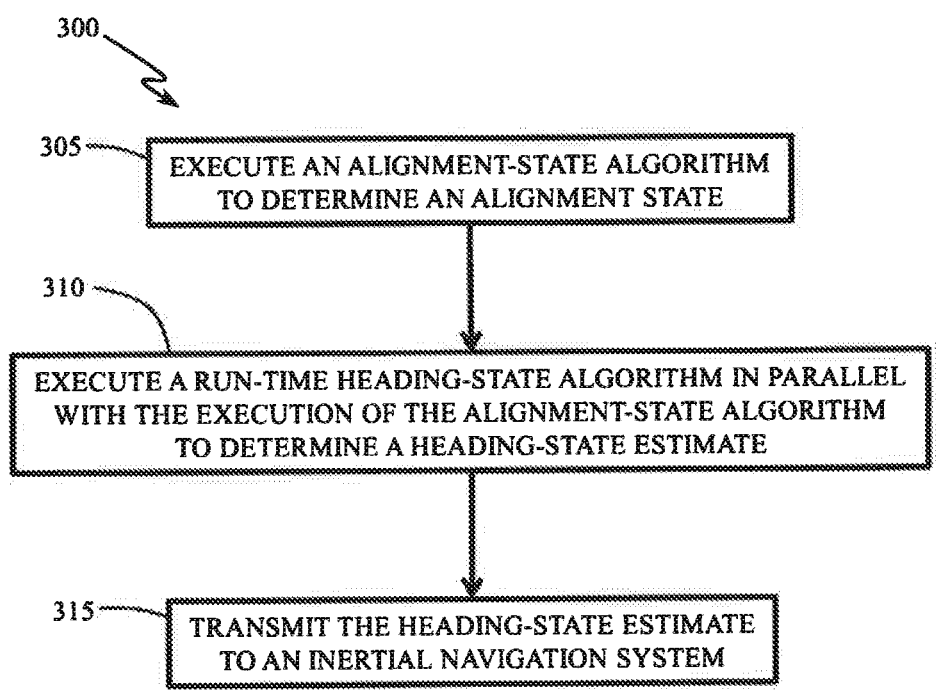
FIG. 3A is a flow diagram illustrating an example method of automatically updating a heading alignment state for an inertial navigation system.

With the foregoing in mind, FIG. 3A illustrates an example method 300 of automatically updating a heading alignment state for an inertial navigation system in parallel with a heading estimation process. In the context of an autonomous merit-based inertial navigation system that includes a network to which genericized sensor data is published, such as autonomous merit-based inertial navigation system 100 of FIG. 1, method 300 is generally directed to functionally performed on the receiving side of the network, for example, network 112.

At block 305, an alignment-state estimation algorithm is executed to determine an alignment state. In this example, the alignment-state estimation algorithm is configured to utilize inertial measurement data and an FOM for a heading observer selected from among a plurality of heading observers to determine the alignment estimate. The inertial measurement data may be provide by an IMU aboard the vehicle at issue, and the FOM may be determined by a suitable heading observation FOM estimator. In some embodiments having a heading-state estimator the same as or similar to heading-state estimator 102 of FIG. 1, the alignment-state estimation algorithm may be executed by alignment-state estimator 128 and may include a Kalman filter or any other suitable state estimation filter. The inertial measurement data may be from IMU sensor input 104(6), and the FOM may be determined by any one of heading observation FOM estimators 124(1) to 124(4), among others. In addition, the FOM may be selected by a suitable FOM selector, such as FOM selector 136 of FIG. 1, for example using the selection process described above in connection with FIG. 1.

At block 310, a run-time heading-state estimation algorithm is executed in parallel with the execution of the alignment-state estimation algorithm at block 305 to determine a heading-state estimate. In this example, the run-time heading-state estimation algorithm is configured to utilize the inertial measurement data and the alignment estimate from block 305 to determine the heading state estimate. The inertial measurement data may be provided by an IMU aboard the vehicle at issue, such as the same IMU mentioned relative to block 305. In some embodiments having a heading-state estimator the same as or similar to heading-state estimator 102 of FIG. 1, the run-time heading-state estimation algorithm may be executed by run-time heading-state estimator 132 and may include a Kalman filter or any other suitable state estimation filter. The inertial measurement data may be from IMU sensor input 104(6).

At block 315, the heading-state estimate is transmitted to the inertial navigation system for use by the inertial navigation system in any suitable manner. In some embodiments in which the autonomous merit-based inertial navigation system is configured the same as or similar to autonomous merit-based inertial navigation system 100 of FIG. 1, the heading-state estimate 152 may be provided to inertial navigation system 156, for example as described above relative to FIG. 1.

Figure 3B:
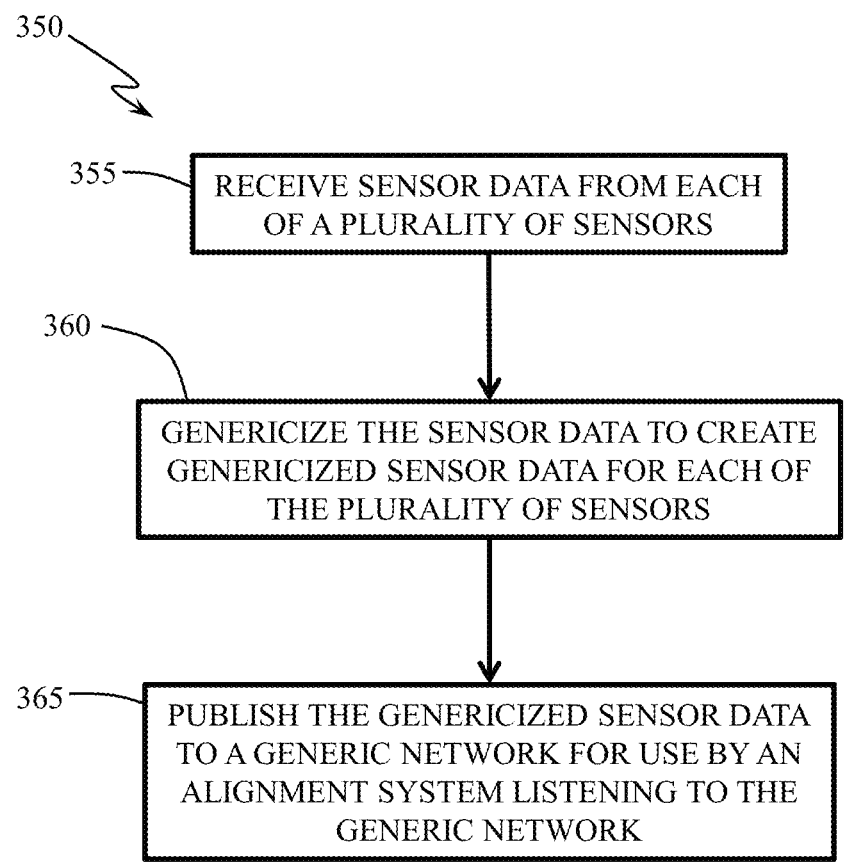
FIG. 3B is a flow diagram illustrating an example method of automatically performing merit-based heading alignment in an inertial navigation system that utilizes a plurality of sensors of differing types.

FIG. 3B illustrates an example method 350 of a method of automatically performing merit-based heading alignment in an autonomous merit-based inertial navigation system that utilizes a plurality of sensors of differing types. At block 355, sensor data is received from each of the sensors. In the context of example autonomous merit-based inertial navigation system 100 of FIG. 1 or similar system, the sensor data may corresponding to any of sensor inputs 104(1) to 104(5), among other examples. At block 360, the sensor data from each of the sensors are genericized to create genericized sensor data for each of the sensors. In the context of example autonomous merit-based inertial navigation system 100 of FIG. 1 or similar system, the genericizing of the sensor data may be performed by any of acquisition applications 120(1) to 120(5).

At block 365, the genericized sensor data of each of the sensors are published to a generic network to provide published genericized sensor data for use by an alignment-state system listening to the generic network. In the context of example autonomous merit-based inertial navigation system 100 of FIG. 1 or similar system, the generic network may be network 112, and the publication at block 365 may be performed by any of acquisition applications 120(1) to 120(5). The alignment-state system may be configured to create a plurality of heading observations based on the published genericized data, generate a FOM for each of the heading observations, and determine which heading observation to use to update an alignment based on the FOMs. The alignment-state system may be composed of one or more components of heading-state estimator 102, including alignment-state estimator 128 and, as needed for a particular application, channels 108(1) to 108(6), observers 116(1) to 116(5), heading-observation FOM estimators 124(1) to 124(4), heading observer selector 136, and run-time state estimator 132, among others.

3. Example Implementations

The following implementations provide examples of how an autonomous merit-based alignment process and navigation system of the present disclosure can be used in a variety of applications. For each application, details on the following aspects of the implementation are provided:

Sensor Suite and Configuration. The sensors used in the heading alignment and estimation process and their configuration and how heading observations are derived from the state observation channels providing the sensor data.

Initial Alignment. How the autonomous merit-based inertial navigation system would typically use the sensor suite and this alignment method to align heading initially.

Run-time Heading Estimation and Alignment. How the autonomous merit-based inertial navigation system would typically use the sensor suite and this alignment method to provide a run-time heading estimation and perform any re-alignment during operation.

Intervention. Any possible intervention tasks the autonomous merit-based inertial navigation system or a supervisor may need to perform based on operational considerations.

Figure 4:
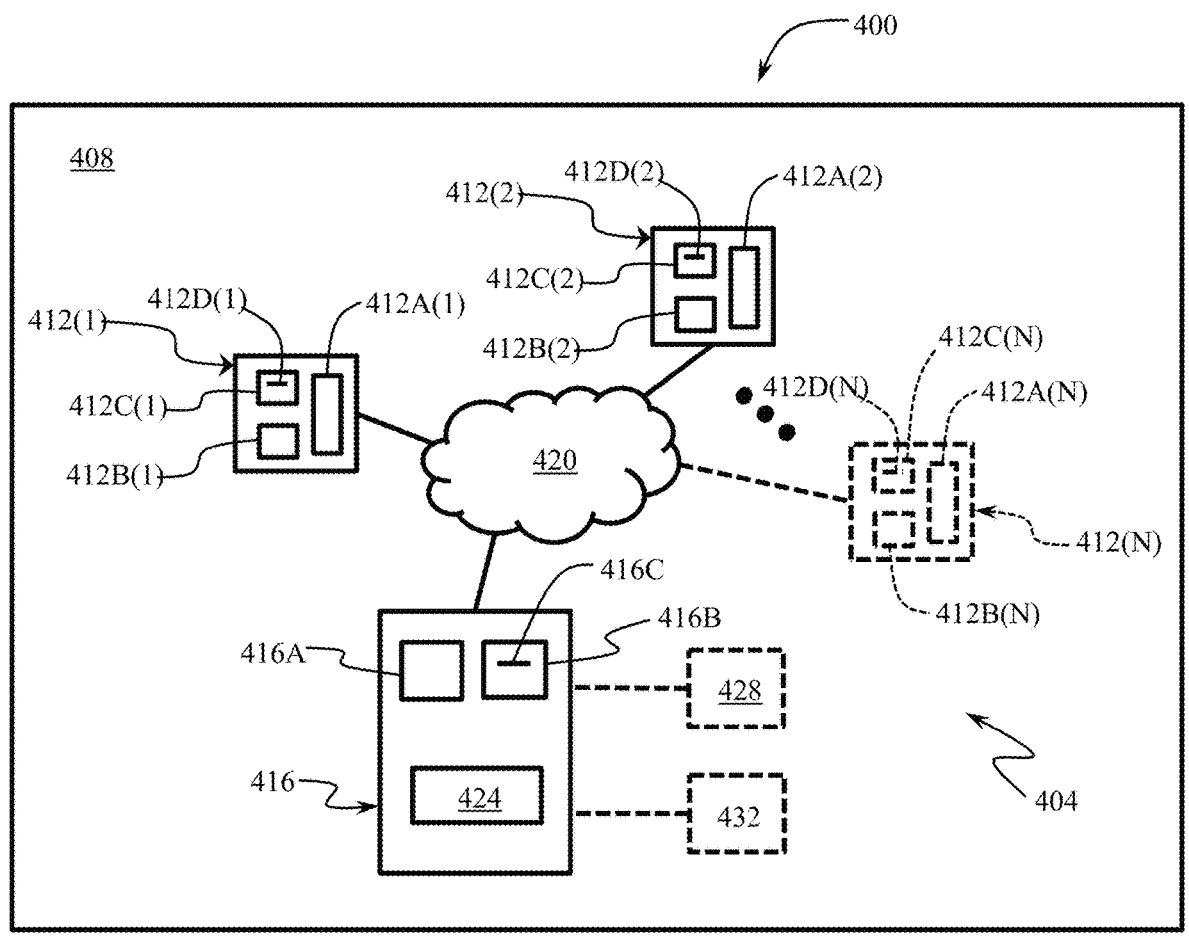
FIG. 4 is a high-level block diagram of an example vehicle deployed with an autonomous merit-based inertial navigation system of the present disclosure.

FIG. 4 illustrates an example implementation 400 of an autonomous merit-based inertial navigation system 404 of the present disclosure that includes components that may be the same as or similar to autonomous merit-based inertial navigation system 100 of FIG. 1. For the sake of convenience, implementation 400 is intended to cover all of the example applications described below in this section as well as other applications disclosed herein and derivable therefrom by those skilled in the art without undue experimentation. In this connection, those skilled in the art will readily understand how aspects, features, and functionalities of the below detailed example implementations map to corresponding aspects, features, and functionalities of implementation 400, such that implementation 400 may be considered generic to the detailed example implementations described below.

Implementation 400 includes a vehicle 408, which may be any one of the vehicles described in this disclosure, such as but not limited to, an autonomous underwater vehicle (AUV), a diver swimming aid, a high-speed diver transportation system, an unmanned surface vehicle (USV), a ship hull grooming robot, a remotely operated vehicle (ROV), and a submarine-launched vehicle. Those skilled in the art will readily understand that these vehicles are merely examples and that many other types of vehicles can benefit from an autonomous merit-based inertial navigation system of the present disclosure, such as autonomous merit-based inertial navigation system 400.

In some embodiments, vehicle 408 may comprise a frame (not shown) and a body (not shown) fixed to the frame, and in other embodiments the vehicle may comprise only a body without a separate frame (e.g., a unibody having an integrated frame). It is noted that the terms "frame," "body," and "body-frame" may generally be used interchangeably herein as referring to physical structure of vehicle 408 regardless of how that structure may be characterized in terms of body, frame, unibody, integrated frame, etc., as those skilled in the art will readily appreciate.

In this example, autonomous merit-based inertial navigation system 404 may be considered to include a plurality of sensor systems 412(1) to 412(N), a navigation engine 416, a communication network 420, a communication system 424, optional user instrumentation 428, and an optional propulsion/orientation system 432. Each of these aspects of vehicle 408 is described below.

Each sensor system 412(1) to 412(N) includes one or more sensors (collectively represented in corresponding respective sensor systems as sensors 412A(1) to 412A(N)) that acquire and/or generate measurements and/or other information, such as imaging information. Examples of sensors that can be part of any one of sensor systems 412(1) to 412(N) appear throughout this disclosure, including the sensors mentioned above relative to FIG. 1 and below relative to example applications of autonomous merit-based inertial navigation systems of the present disclosure. In addition to sensor(s) 412A(1) to 412A(N), each sensor system 412(1) to 412(N) may include at least one processor (collectively represented as processor 412B(1) to 412B(N)) and memory 412C(1) to 412C(N). Each processor 412B(1) to 412B(N) is configured to execute machine-executable instructions 412D(1) to 412(N), contained in memory 412C(1) to 412C(N), that provide and control the functionality of the corresponding sensor system 412(1) to 412(N). Examples of functionalities that each processor 412B(1) to 412B(N) and machine-executable instructions 412D(1) TO 412D(N) may provide include, but are not limited to, acquiring raw data from sensor(s) 412A(1) to 412A(N), processing the raw data from the sensor(s), and providing the data genericizing and publication functionalities of corresponding respective acquisition applications (not illustrated, but see acquisition applications 120(1) to 120(4) of FIG. 1), among other things. Those skilled in the art will readily appreciate the necessary functionalities may depend on the design and configuration of the sensor system 412(1) to 412(N) and will understand the required corresponding machine-executable instructions for providing those functionalities.

Navigation engine 416 may comprise one or more processors (collectively represented as processor 416A), memory 416B, and machine-executable instructions 416C that work together to provide the requisite functionalities of at least the navigation engine. Functionalities of navigation engine 416 may include, but not be limited to, performing all of the functionalities of a merit-based heading-state estimator (such as merit-based heading-state estimator 102 of FIG. 1), providing navigation functionality and control of an inertial navigation system (such as inertial navigation system 156 of FIG. 1), providing onboard instrumentation control and/or interfacing, and providing onboard and/or offboard input/output functionalities for communicating with any other onboard system(s) (not shown) and/or any offboard system(s) (not shown), among others. These functionalities may be provided by suitable algorithms (not show but embodied in machine-executable instructions 416C), such as, but not limited to, respectively, heading-state estimation algorithms for determining heading-state estimates, navigation control algorithms for controlling any onboard propulsion/orientation system 432 based on the heading-state estimates, instrumentation algorithms that may be needed to drive and/or interface with any user instrumentation 428 that may be aboard vehicle 408, and input/output (I/O) algorithms for performing any necessary I/O communications and operations with other onboard system(s) (not shown) and/or any offboard system(s) (not shown), among others. Those skilled in the art will readily understand how to implement any of these and/or other algorithms using the present disclosure as a guide and ordinary skill in the art without undue experimentation.

Processor(s) 416A of navigation engine 416, as well as processor(s) 412B(1) to 412B(N) of each sensor system 412(1) to 412(N), may be, for example, any suitable type processor(s), such as a microprocessor, an application specific integrated circuit, part of a system on a chip, or a field-programmable gate array, among other architectures. Processor(s) 416A of navigation engine 416, as well as processor(s) 412B(1) to 412B(N) of each sensor system 412(1) to 412(N), is/are configured to execute the corresponding machine-executable instructions 416C and 412D(1) to 412D(N) to provide the respective functionalities of the navigation engine and sensor systems. Memory 416B of navigation engine 416, as well as memory 412C(1) to 412C(N) of each sensor system 412(1) to 412(N), may be any type(s) of suitable machine memory, such as cache, RAM, ROM, PROM, EPROM, and/or EEPROM, among others. Machine memory can also be another type of machine memory, such as a static or removable storage disk, static or removable solid-state memory, and/or any other type of persistent hardware-based memory. Fundamentally, there is no limitation on the type(s) of memory other than it be embodied in hardware. Machine-executable instructions 420C, as well as 412D(1) to 412D(N) compose the software (e.g., firmware) of autonomous merit-based inertial navigation system 404 and the corresponding respective sensor system 412 (1) to 412(N).

Communication network 420 may be any suitable communication network or combination of networks, including wired and wireless networks, and can be, for example, a LAN that operates on any suitable communication protocol, such as, UDP, TCP-IP, CAN, RS485422 ad-hoc, MODBUS, etc.

Communication system 424 may include any type(s) of communication port(s) and/or communication device(s) suitable for any communications needed for navigation engine 416 to operate and provide its central navigation role. Examples of communication ports, devices, and protocols are provided above in connection with the description of FIG. 1. Those skilled in the art will readily appreciate that there are many other types of communication ports and devices, as well as other communication protocols, that can be used to suit a particular design and that such skilled artisans will be able to implement any such ports, devices, and protocols using knowledge in the art without undue experimentation.

Optional user instrumentation 428 may include any one or more devices for communicating navigational information to a user, either onboard vehicle 408 or offboard the vehicle, or both. Examples of user instrumentation 428 include, but are not limited to, electronic navigation displays, mechanical navigation instruments, electro-mechanical navigation instruments, one or more other computing systems, etc.

Optional propulsion/orientation system 432 may include any device(s) and/or system(s) for propelling and/or controlling the orientation (roll, pitch, and/or yaw) of vehicle 408. Examples of such devices and or systems include, but are not limited to, fixed propellers, azimuth thrusters, lateral thrusters, rudders, and control planes (e.g., sail planes, stern planes, bow planes, lateral planes, etc.), among others. Fundamentally, if provided, there is no limitation on the type(s) of propulsion/orientation device(s) and or system(s) that can be part of propulsion/orientation system 432.

With this generic implementation 400 in mind, following are a number of detailed example implementations to illustrate strengths and flexibility of an autonomous merit-based inertial navigation system of the present disclosure.

3.1 Miniature AUV Application

AUVs are traditionally torpedo-shaped vehicles. Miniature AUVs have the potential of serving in a number of roles for littoral warfare, science, and security applications. The navigation systems used for miniature AUVs are typically dead-reckoning systems that rely heavily on the quality of the heading estimates for overall navigational accuracy. An autonomous merit-based alignment process as disclosed herein can help miniature AUVs realize their fullest potential because it can provide a navigation solution that optimizes SWaP-C considerations.

Miniature AUVs navigate in the world coordinate frame.

3.1.1 Sensor Suite and Configuration

In a miniature AUV application, all sensors are contained within the AUV and are plugged into the same processor via separate serial ports. A device driver services each serial port to provide the sensor data on the independent observation channels via a UDP datagram on a LAN.

[IMU Channel] Fiber Optic Gyro (FOG) IMU (3-axis gyros, 3-axis accelerometers). The FOG IMU is a high-grade gyro with a very low drift. This sensor allows for dead-reckoning the heading between alignment periods very accurately with little drift.

[Onboard Heading Channel] Magnetic Compass. The magnetic compass of this example is a typical magnetic compass that is calibrated within the AUV and calibrated at the operational site of each dive. The error is assumed to be minor and homogeneous but non-zero. The compass is also known to be degraded when the propulsion is running more than 15% full-scale.

[World-Frame Position Channel] GPS. The GPS is on the AUV mast and can only provide a position update when the AUV is on the surface. The GPS provides a quality metric based on the HDOP figure provided from the receiver itself.

[Body-Frame Velocity Channel] DVL. The DVL measures velocity over the bottom when the AUV is within 1 m and 100 m of the bottom and when the DVL is within +1° to 20° of normal to the seafloor. Within this range, the DVL is a very accurate sensor with an error that is known to be minimal and pure-Gaussian in nature.

3.1.1.1 Heading Observations

Magnetic Heading Observation. The Magnetic Compass and IMU are filtered together through a Kalman Filter to provide a stable and high-rate heading observation based on the compass heading observation.

Transit Heading Observation. The autonomous merit-based inertial navigation system uses the positioning data on the position channel to derive a world-frame velocity (speed and direction) estimate. The autonomous merit-based inertial navigation system uses data from the velocity observation channel filtered with acceleration data from the inertial sensor of the IMU to derive a body-frame velocity estimate. Subtracting the body-frame velocity vector from the world-frame velocity vector yields the direction of the actual vehicle heading estimate.

3.1.1.2 Figure of Merit Rules

The Magnetic Heading Observation on the onboard heading channel is known to be non-zero but homogeneous so it is penalized by a constant 5.0 FOM if the main propulsion is below 15% and 15.0 if the main propulsion is greater than 15%. The FOM base is simply the standard deviation of the estimated heading.

The Transit Heading Observation simply uses the standard deviation of the estimated heading scaled by the GPS HDOP if the DVL is reporting a valid bottom lock.

3.1.2 Initial Alignment

When the autonomous merit-based inertial navigation system boots, it uses the magnetic heading observation to initialize the heading estimate.

3.1.3 Run-Time Heading Estimation and Alignment

During run-time, the autonomous merit-based inertial navigation system has a very low drift rate due to the FOG. Therefore, it relies on maintaining a current alignment with a low FOM. The autonomous merit-based inertial navigation system runs the heading estimate inertial only with no aiding from a heading observation.

3.1.4 Intervention

The autonomous merit-based inertial navigation system monitors the FOM of the heading estimate. When this FOM degrades to an unacceptable value, it autonomously realigns using either the Magnetic Heading Observation or the Transit Observation based on the FOM rules provided. The AUV may either go to the surface and transit until it achieves a low FOM through the Transit Heading Observation or may drop its main propulsion below 25% to get a good FOM from the Magnetic Heading Observation. The system will choose which observation to use based on the availability and quality of each. Once the alignment estimation process achieves a FOM lower than the current heading estimate FOM, the system re-initializes automatically.

3.2 Diver Navigation Application

Unlike the AUV application, the autonomous merit-based inertial navigation system in a diver application can be exposed to a very wide range of potential operational conditions and scenarios. For example, the autonomous merit-based inertial navigation system may be used as a swimming aid by a diver or within a high-speed diver transportation system. Like the Miniature AUV application though, SWaP-C optimization is critical. Therefore, the sensors selected for the autonomous merit-based inertial navigation system in a diver application are carefully chosen to optimize size, weight, power, and cost while relying on the autonomous alignment method disclosed herein to provide for the navigation accuracy required in the field.

A diver navigates in the world coordinate frame.

3.2.1 Sensor Suite and Configuration

This sensor architecture uses sensors onboard the diver device as well as external to the diver device. The autonomous merit-based inertial navigation system takes advantage of the distributed sensor architecture enabled by the observation publishing method implemented via UDP datagrams on a LAN.

[IMU Channel] Fiber Optic Gyro IMU (3-axis gyros, 3-axis accelerometers). The FOG IMU is a high-grade gyro with a very low drift. This sensor allows for dead-reckoning the heading between alignment periods very accurately with little drift.

[Offboard Heading Channel] External Heading Reference. The external heading reference comes from a deployment platform (ship, submarine, etc.), a high-grade north-seeking gyro, or a differential GPS system providing heading. It is a True-North system and assumed to be very high quality with a negligible homogeneous error. The external heading source is not within the diver device and provides heading observation data through the autonomous merit-based inertial navigation system's LAN either wiredly or wirelessly.

[Onboard Heading Channel] Magnetic Compass. The magnetic compass of this example is a typical magnetic compass that is calibrated within the diver device at the factory and then profiled for performance data through latitudes ranging from +85N to −85S to understand the heading error as a function of latitude. A compensation algorithm is employed within the compass to force all errors to converge to 0 at a single heading, independent of the latitude. The heading error is then known to be 0 at this one "alignment heading" with an error relative to the latitude outside of that specific heading.

[World-Frame Position Channel] GPS. The GPS is on the diver device mast and can only provide a position update when the AUV is on the surface. The GPS provides a quality metric based on the HDOP figure provided from the receiver itself.

[Body-Frame Velocity Channel] DVL. The DVL measures velocity over the bottom when the diver is within 1 m and 100 m of the seafloor and when the DVL is within +/−20 deg of normal to the seafloor. Within this range, the DVL is a very accurate sensor with an error that is known to be minimal and pure-Gaussian in nature.

[Scene-Relative Channel] Imaging Sonar. The imaging sonar faces forward on the diver navigation devices and provides a 2D image of the scene in front of the diver out to approximately 50 m.

3.2.1.1 Heading Observations

External Heading Observation. The external heading source and IMU are filtered together through a Kalman Filter to provide a stable and high-rate heading observation based on the external heading observation.

Magnetic Heading Observation. The Magnetic Compass and IMU are filtered together through a Kalman Filter to provide a stable and high-rate heading observation based on the compass heading observation.

Transit Heading Observation. The autonomous merit-based inertial navigation system uses the positioning data on the world-frame position channel to derive a world-frame velocity (speed and direction) estimate. The autonomous merit-based inertial navigation system uses data from the onboard velocity channel filtered with acceleration data from the inertial sensor of the IMU to derive a body-frame velocity estimate. Subtracting the body-frame velocity vector from the world-frame velocity vector yields the direction of the actual vehicle heading estimate.

Scene-Relative Heading Observation. Using a map containing features with known coordinates, the scene-relative heading observation produces a heading estimate by correlating features in the sonar data to known features on the map. Once it can correlate at least two features in the sonar data to features on the map, it can produce a heading estimate.

3.2.1.2 Figure of Merit Rules

The External Heading Observation is always preferred if it is available. The FOM for this observation is based on statistical stability and any quality metric (usually HDOP) coming from the external sensor.

The Magnetic Heading Observation is known to be zero at the specific alignment heading and scaled proportionally relative to latitude away from the alignment heading. On the alignment heading, the FOM is theoretically 0. However, since this is a magnetic compass, we still penalize the overall FOM by 5.0.

The Transit Heading Observation simply uses the standard deviation of the estimated heading scaled by the GPS HDOP if the DVL is reporting a valid bottom lock.

The accuracy of the Scene-Relative Heading Observation is based on the correlation confidence between the sonar features and the map and the stability of the sonar feature locations. The correlation algorithm produces a confidence metric, which, with the statistical stability of the heading estimate, produces the foundation of the FOM. A rule may also be applied stating the assumed accuracy of the map data.

3.2.2 Initial Alignment

When the autonomous merit-based inertial navigation system is powered on, it will perform an initial alignment off of either the external source or the internal magnetic compass, if the external source is not available.

3.2.3 Run-Time Heading Estimation and Alignment

Prior to beginning a dive, the operator may need to realign the system to improve the alignment. To do so, he/she would either transit on the surface to get a good FOM with the surface alignment estimate, point the system at known features to achieve a good FOM with the scene-relative alignment, or point the system at the alignment heading to achieve a good FOM with the magnetic-based heading observation.

While the diver is underway, the heading estimate is based solely on the gyro, dead-reckoning from the last alignment.

3.2.4 Intervention

The autonomous merit-based inertial navigation system is continuously aware of the quality of the heading estimate by monitoring the FOM of the heading estimate. If the FOM of the heading estimate, and associated estimated navigation error, exceeds an acceptable threshold, the diver could reinitialize the system by transiting on the surface, transiting in the direction of the alignment heading, or by imaging known features on the seafloor with the sonar. The autonomous merit-based inertial navigation system will select the heading estimate with the lowest FOM and once that FOM is lower than the current heading estimate, it will re-initialize the heading estimation process to that alignment value.

Since magnetic compasses are widely impacted by the presence of ferrous objects, the operator needs to monitor the proximity of the navigation system to ferrous materials (e.g., ships, submarines, quay walls, anchors, weapons, etc.). When the autonomous merit-based inertial navigation system is too close to a ferrous object, the diver may want to just disable the magnetic compass heading observation to prevent its inclusion in the alignment estimation process.

3.3 Miniature Unmanned Surface Vehicle

Miniature unmanned surface vehicles (USVs) are becoming very popular in riverine and coastal applications for conducting hydrographic surveys. Since these vehicles are surface vehicles, they have GPS and typically run a differential GPS for superb heading derivation. Should the GPS system become impaired (such as during an equipment failure or in GPS-denied environments) and unable to provide a suitable heading measurement, an inertial heading estimate is required.

The USV navigates in the world coordinate frame.

3.3.1 Sensor Suite and Configuration

All sensors on the USV are contained within the USV frame.

[IMU Channel] Fiber Optic Gyro IMU (3-axis gyros, 3-axis accelerometers). The FOG IMU is a high-grade gyro with a very low drift. This sensor allows us to dead-reckon the heading between alignment periods very accurately with little drift.

[Onboard Heading Channel] GPS Heading Reference. The GPS heading reference derives the platform heading from the relative positions of two antennas on the USV.

3.3.1.1 Heading Observations

GPS Heading Observation. The GPS heading source and IMU are filtered together through a Kalman Filter to provide a stable and high-rate heading observation based on the GPS heading observation.

3.3.1.2 Figure of Merit Rules

The GPS Heading Observation is always preferred if it is available. The FOM for this observation is based on statistical stability and any quality metric (usually HDOP) coming from the GPS heading sensor.

3.3.2 Initial Alignment

When the autonomous merit-based inertial navigation system boots, it uses the GPS heading observation to initialize and align the heading estimation process.

3.3.3 Run-Time Heading Estimation and Alignment

During run-time, when the GPS heading observation is producing a good quality measurement, the heading estimate is simply the output of the alignment process as it is already fusing the GPS heading source and the gyro to provide a superior and high-rate heading estimate. During this process, the heading estimation process is running in pure inertial mode dead-reckoning from the last alignment value. As the alignment process computes an alignment estimate with a FOM better than that of the current heading estimate, it reinitializes the heading estimation process. Should the GPS heading observation become unavailable during the run-time, the system simply uses the output of the parallel heading estimation process versus the aided alignment process.

3.3.4 Intervention

There is little intervention required in this configuration. However, the USV may monitor the FOM of the heading estimate. If the FOM of the heading estimate exceeds an acceptable threshold, it may autonomously maneuver to help ensure an alignment from the alignment process with a low FOM. To do this, the control system of the USV may simply steer a constant heading, ensuring good GPS reception and statistical stability of the heading observation, to achieve a low FOM.

3.4 Ship-Hull Grooming Robot

Ship hull grooming is the process of gently brushing a ship hull with soft bristle brushes to remove biofilm before it can mature into hard biofouling. Hull grooming is extremely attractive to the ship husbandry industry in that it has the potential to reduce traditional cleaning costs drastically while saving substantial costs on propulsive fuel typically lost to the drag effects of biofouling. To be viable though, it has to be done robotically once a week and it must leave absolutely no ungroomed area. This requires the hull-grooming robot to have excellent navigation, less than 0.15 m positioning error, over the hull to ensure no voids are left in the grooming that would allow a biofouling colony to mature and develop beyond what the gentle cleaning brushes could remove. Because accurate ship hull navigation is currently not possible, this asset remains elusive to the industry.

The small size of the hull-grooming robot necessary for hull grooming precludes a large sensor package. Therefore, it also precludes extremely high-end navigation and positioning sensors. Due to operational considerations, the hull-grooming robot must natively contain all of the navigation tools and cannot rely on an external framework of tracking sensors. Therefore, the autonomous merit-based inertial navigation system must dead-reckon along the hull relying on realignment and re-initialization to bound the error growth of the navigation system. Further, the hull-grooming robot must navigate in a frame relative to the ship hull. This is typically a non-rigid deformed coordinate frame sheeted across the hull with the origin on the waterline at the bow and the X-axis against the hull perpendicular to the gravity vector.

The autonomous alignment method presented here enables accurate navigation on the ship hull in that it provides a means to realign the heading system within the non-rigid deformed coordinate system on the ship hull and achieve the 0.28° heading accuracy required for 0.15 m dead-reckoning positioning error. Because the system presented here is entirely autonomous, it is operator friendly and enables operation by non-skilled robot operators trained as ship-husbandry professionals.

The ship-hull grooming robot navigates within a coordinate frame bound to the work region on the hull where it is operational. This is a deformed hull-relative and arbitrary coordinate frame with no mapping or transform to the Earth's frame.

3.4.1 Sensor Suite and Configuration

The sensor suite for the ship-hull grooming robot is entirely contained within the hull-grooming robot.

[IMU Channel] Fiber Optic Gyro IMU (3-axis gyros, 3-axis accelerometers). The FOG IMU is a high-grade gyro with a very low drift. This sensor allows dead-reckoning of the heading between alignment periods very accurately with little drift. The accelerometers also provide a means to sense orientation with respect to the gravity vector.

[Onboard Heading Channel] Differential pressure sensor. The hull-grooming robot utilizes a differential pressure sensor to detect the pressure gradient of the water column. When the pressure across the differential system is equal, the transducers are aligned with sea surface and along the X-axis. This relationship between the forward transducer and the rear transducer provides a reasonable indication of orientation within the operating frame (heading) on high-slope areas of the hull.

[Offboard Position Channel] Manual Input. The operator manually initializes the location of the hull-grooming robot on the ship hull and can provide observations of the hull-grooming robot on the ship hull as needed.

[Onboard Velocity Channel] Track Odometry. The hull-grooming robot crawls along the ship hull using two tracks. Instrumenting each track to measure the odometry of the track tread provides the information to derive vehicle velocity.

[Scene-Relative Channel] Imaging Sonar. The imaging sonar faces forward on the robot and provides a 2D image of the scene in front of the robot out to about 10 m.

3.4.1.1 Heading Observations

Heading Observation. The differential pressure system and IMU are filtered together through a Kalman Filter to provide a stable and high-rate heading observation within high-slope environments of the ship hull.

Scene-relative Heading Observation. Using a map of the ship hull containing features with known coordinates, the scene-relative heading observation produces a heading estimate by correlating features in the sonar data to known features on the map. Once the heading observation can correlate at least two features in the sonar data to features on the map, it can produce a heading estimate absolute to the maneuvering frame. The scene-relative heading observation also correlates features in one frame to features imaged in a previous frame and derives a heading change observation which is used to stabilize the drift of the gyro.

3.4.1.2 Figure of Merit Rules

The differential pressure system provides the best observation of heading on very high-slope areas of the ship hull where the Y-axis is closest to the gravity vector. The further the Y-axis gets from the gravity vector, the larger the error can be in the heading estimate from the differential heading system. The FOM of this observation is proportional to the coincidence of the Y-axis and the gravity vector.

The accuracy of the Scene-Relative Heading Observation is based on the correlation confidence between the sonar features and the map of the ship hull and the stability of the sonar feature locations. The correlation algorithm produces a confidence metric which, with the statistical stability of the heading estimate, produces the foundation of the FOM. A rule may also be applied stating the assumed accuracy of the map data.

3.4.2 Initial Alignment

When the hull-grooming robot is powered on, it has no heading observation. The operator begins the hull grooming process on the side of the ship close to the water on a high-slope section of hull. Here, the hull-grooming robot is able to reconcile a heading observation from the differential pressure system and uses this observation to align the system initially to the maneuvering frame.

3.4.3 Run-Time Heading Estimation and Alignment

During run-time, the hull-grooming robot estimates heading using the FOG in pure-inertial mode dead-reckoning from the last alignment. The automated merit-based inertial navigation system uses the heading observation from the differential pressure system to realign the heading estimate process as an alignment where a good figure of merit is realized, such as on a high-slope area. Because the scene-relative system is able to provide an alignment with a low FOM from scene features it correlates to the hull map, it will provide alignment values to the heading estimation process.

3.4.4 Intervention

The hull-grooming robot may be deployed entirely autonomously, in a supervised autonomy mode, or under full operator control. In the autonomous modes, the hull-grooming robot monitors the quality of the current heading estimate based on the FOM associated with the heading estimate. When the FOM of the current heading estimate exceeds an acceptable threshold, the hull-grooming robot transits to a section of the hull to locate known features it can use to estimate a reliable heading alignment. The hull-grooming robot can also transit to a high-slope section of the hull to get a heading observation from the differential pressure system with a low FOM. In a manned mode of operation, the operator manually conducts any of the closed-loop alignment methods described above or provides the vehicle with a manual observation of heading on the ship hull.

3.5 Miniature Remotely Operated Vehicle

Remotely Operated Vehicles (ROVs) have been used in offshore construction, inspection, and intervention roles for decades. Traditionally, these vehicles have been very large and have required substantial support and operations infrastructure resulting in daily operations rates near or exceeding $150 k. A new cost model is required in the commercial offshore industry such that ROVs can work cost-effectively with lower oil prices. The primary driver of cost for these ROVs has been their size, and the primary driver for their size has been the navigation accuracy required, and thus the number and type of sensors required. Using smaller ROVs to perform work offshore would enable much lower cost operations, but would require a navigation method that optimizes SWaP-C considerations. The autonomous alignment method outlined here provides a means for enabling a highly SWaP-C optimized navigation system having the accuracy required by the commercial offshore industry.

In this example, a miniature ROV uses a autonomous alignment and heading estimation method as disclosed herein to realize extremely accurate heading orientation in complex environments.

Due to the ferrous composition of most subsea structures around which the ROV operates, magnetic compassing is highly inaccurate except when the ROV is very far from the worksite.

The ROV navigates within both the Earth frame and a local work area frame, switching between the two to provide for navigation requirements and relative positioning requirements.

3.5.1 Sensor Suite and Configuration

The sensor suite of the miniature ROV may be distributed throughout the ROV network. The majority of sensors may be on the ROV. However, the Ultra Short BaseLine (USBL) or Long BaseLine (LBL) system is likely ship-based and provides observations of the ROV's position over the ROV LAN.

[IMU Channel] Fiber Optic Gyro IMU (3-axis gyros, 3-axis accelerometers). The FOG IMU is a high-grade gyro with a very low drift. This sensor allows us to dead-reckon the heading between alignment periods very accurately with little drift. The accelerometers also provide a means to sense orientation with respect to the gravity vector.

[Onboard Heading Channel] Magnetic Compass. The magnetic compass is a typical magnetic compass that is calibrated within the ROV and calibrated at the operational site of each dive. The error is assumed to be non-zero, minor, and homogeneous. The compass is also known to be degraded when the propulsion is running more than 15% full-scale and when the vehicle is near structures.

[Offboard Position Channel] USBL or LBL. The USBL or LBL systems used for ROV positioning are acoustic positioning systems. These systems position the vehicle relatively in an acoustic frame and then translate that to the "world-frame" by knowing the orientation and position of the acoustic frame within the world.

[Onboard Velocity Channel] DVL. The DVL measures velocity over the seafloor when the diver is within 1 m and 100 m of the bottom and when the DVL is within +/−20° of normal to the seafloor. Within this range, the DVL is a very accurate sensor with an error that is known to be minimal and pure-Gaussian in nature.

[Scene-Relative Channel] Imaging Sonar. The imaging sonar faces forward on the ROV and provides a 2D image of the scene in front of the ROV out to approximately 50 m.

3.5.1.1 Heading Observations

Magnetic Heading Observation. The autonomous merit-based inertial navigation system filters the magnetic compass heading observation with the IMU gyro data to derive a stable and high-rate magnetic heading observation.

Transit Heading Observation. The autonomous merit-based inertial navigation system uses the positioning data on the position channel to derive a world-frame velocity (speed and direction) estimate. The autonomous merit-based inertial navigation system uses data from the velocity observation channel filtered with acceleration data from the inertial sensor to derive a body-frame velocity estimate. Subtracting the body-frame velocity vector from the world-frame velocity vector yields the direction of the actual vehicle heading estimate.

Scene-Relative Heading Observation. Using a map of a worksite containing features with known coordinates, the scene-relative heading observation produces a heading estimate by correlating features in the sonar data to known features on the map. Once it can correlate at least two features in the sonar data to features on the map, it can produce a heading estimate absolute to the maneuvering frame. The scene-relative heading observation also correlates features in one frame to features imaged in a previous frame. It also derives a heading change observation, or a purely scene-relative heading observation, which is used to stabilize the drift of the gyro.

3.5.1.2 Figure of Merit (FOM) Rules

The Magnetic Heading Observation is known to be non-zero but homogeneous so it is penalized by a constant 5.0 FOM if the main propulsion is below 15% and 15.0 if the main propulsion is greater than 15%. The FOM base is simply the standard deviation of the estimated heading.

The error in the Magnetic Heading Observation is known to be non-zero but homogeneous if it is away from ferrous influences. All features in the sonar are assumed to contain ferrous content and if the ROV is on the surface (depth=0.0 m) then it is assumed to be near the ship, a highly ferrous object. The FOM of the Magnetic Heading Observation is further penalized proportionally to the proximity of features and by a static 25.0 when on the surface.

The Transit Heading Observation simply uses the standard deviation of the estimated heading reporting a good bottom lock. The transit heading observer requires a speed of at least 1.0 m/s to compute an accurate observation.

The accuracy of the Scene-Relative Heading Observation is based on the correlation confidence between the sonar features and the map of the ship hull and the stability of the sonar feature locations. The correlation algorithm produces a confidence metric which, with the statistical stability of the heading estimate, produces the foundation of the FOM. A rule may also be applied stating the assumed accuracy of the map data.

3.5.2 Initial Alignment

When the ROV is first powered on, it aligns the heading estimate using the magnetic heading observation. As the ROV is typically powered on aboard a ship (i.e., a large steel ship) the quality of this alignment is typically very poor.

3.5.3 Run-Time Heading Estimation and Alignment

Once the ROV is deployed and in transit through the water column to the seafloor, the operator may command, or the vehicle may autonomously decide, to conduct a realignment with the compass. It does this by orienting to a particular heading and reducing thrust for a period. Once the vehicle is stable, the FOM associated with the magnetic heading observation becomes very low and the autonomous merit-based inertial navigation system will align the heading estimation process once the FOM of the magnetic heading observation is lower than the current heading estimate FOM.

Once on the seafloor, the ROV conducts operations by estimating its heading using the FOG in pure inertial mode, dead-reckoning from the last alignment. The ROV does not use the magnetic compass to aid the heading estimate because the effects of the thrusters, seafloor, and worksite are unknown and the error from the compass is assumed to be unmodeled, non-random, and non-homogenous.

Within the work site, the ROV will be working around structures on the seafloor that it may be able to correlate to a known map of the worksite. If the ROV is able to correlate features in the sonar with map items, the autonomous merit-based inertial navigation system may realign the heading estimate with an alignment derived from the scene-relative observation. This can occur if the FOM of that alignment is lower than the FOM of the current heading estimate.

While the ROV is transiting on the seafloor, the transit heading observer may be able to produce an alignment observation. If at any time this alignment observation has a FOM lower than the FOM of the current heading observation, the autonomous merit-based inertial navigation system will realign using that alignment estimate.

3.5.4 Intervention

During operation, the ROV and operators are able to monitor the quality of the heading estimate with the FOM of the current heading estimate. If the FOM of the current heading estimate exceeds an allowable threshold, the ROV may autonomously decide to perform a realignment procedure or the ROV operator may command a realignment procedure.

To realign, the ROV may transit away from the worksite, reduce thrust, and remain motionless on a particular heading. Once the FOM of the Magnetic Heading Observation drops below the FOM of the current heading estimate, the heading estimation process will realign.

The ROV may also use the heading observation from the scene-relative heading observer. The ROV can use a closed-loop control routine to improve the FOM from the scene-relative observer by monitoring the FOM from the observer and working to improve the correlation between map features and sonar features. Once the FOM of the scene-relative heading observation is lower than the current heading estimate FOM, the autonomous merit-based inertial navigation system will realign.

The most common way the ROV will self-realign is to use the transit alignment observation. For this observation to work well, the ROV needs to be transiting in a straight line with as much speed as possible. The ROV can turn from the work site, transit along a straight route using closed-loop control-to-control heading, speed, and position. The ROV can monitor the FOM and continue the transit until it achieves an acceptable FOM from the transit heading observer. Once the transit heading observer provides an alignment estimate with a FOM lower than the FOM of the current heading estimate, the autonomous merit-based inertial navigation system will realign.

3.6 Submarine-Launched Vehicle

Miniature submarine-launched vehicles are commonly used for a wide range of surveillance tasks. These vehicles have the potential to be a very useful tool in subsea warfare and reconnaissance activities. Currently, the lack of an accurate navigation solution for these miniature vehicles is prohibiting them from realizing their full potential.

An autonomous alignment and heading estimation process disclosed herein provides a meaningful and viable solution for these vehicles in that it provides a very good means for initial alignment and self-alignment after launch during long missions.

A submarine-launched vehicle transits in the world frame.

3.6.1 Sensor Suite and Configuration

The submarine-launched vehicle uses a sensor suite contained within the vehicle and distributed within the submarine.

[IMU Channel] Fiber Optic Gyro IMU (3-axis gyros, 3-axis accelerometers). The FOG IMU is a high-grade gyro with a very low drift. This sensor allows us to dead-reckon the heading between alignment periods very accurately with little drift.

[Offboard Heading Channel] External Heading Reference. The vehicle launches from a torpedo tube on the submarine. This torpedo tube has a known orientation and position within the submarine frame, and the submarine knows its current heading and position within the world frame. Prior to launch, the vehicle is getting a constant update of heading from the submarine based on its position on the torpedo rail.

[Onboard Heading Channel] Magnetic Compass. The magnetic compass is a typical magnetic compass that is calibrated within the diver device at the factory and then profiled for performance data through latitudes ranging from +85N to −85S to understand the heading error as a function of latitude. A compensation algorithm is employed within the compass to force all errors to converge to 0 at a single heading, independent of the latitude. The heading error is then known to be 0 at this one "alignment heading" with an error relative to the latitude outside of that specific heading.

[World-Frame Position Channel] GPS. The GPS is on the submarine-launched vehicle mast and can only provide a position update when the AUV is on the surface. The GPS provides a quality metric based on the HDOP figure provided from the receiver itself.

[World-Frame Position Channel] Submarine-relative tracking. While the submarine-launched vehicle is within 500 m of the submarine, the submarine can track the vehicle with high accuracy and provide a tracking solution back to the vehicle via acoustic communications.

[Body-Frame Velocity Channel] DVL. The DVL measures velocity over the bottom when the diver is within 1 m and 100 m of the bottom and when the DVL is within +/−20° of normal to the seafloor. Within this range, the DVL is a very accurate sensor with an error that is known to be minimal and pure-Gaussian in nature.

3.6.1.1 Heading Observations

External Heading Observation. The external heading source and IMU are filtered together through a Kalman Filter to provide a stable and high-rate heading observation based on the external heading observation.

Magnetic Heading Observation. The Magnetic Compass and IMU are filtered together through a Kalman Filter to provide a stable and high-rate heading observation based on the compass heading observation.

Transit Heading Observation. The system uses the positioning data on either position channel to derive a world-frame velocity (speed and direction) estimate. The system uses data from the velocity observation channel filtered with acceleration data from the inertial sensor of the IMU to derive a body-frame velocity estimate. Subtracting the body-frame velocity vector from the world-frame velocity vector yields the direction of the actual vehicle heading estimate.

3.6.1.2 Figure of Merit Rules

The External Heading Observation is always preferred if it is available. The FOM for this observation is based on statistical stability and any quality metric (usually HDOP) coming from the external sensor.

The Magnetic Heading Observation is known to be zero at the specific alignment heading and scale proportionally relative to latitude away from the alignment heading. On the alignment heading, the FOM is theoretically zero. Since this is a magnetic compass, the overall FOM is penalized by 5.0.

The Transit Heading Observation simply uses the standard deviation of the estimated heading scaled by the GPS HDOP if the DVL is reporting a good bottom lock.

3.6.2 Initial Alignment

The submarine-launched vehicle does the initial alignment on the torpedo tube rail using the external heading observation channel.

3.6.3 Run-Time Heading Estimation and Alignment

Once the submarine-launched vehicle launches and leaves the torpedo tube rail, it loses the external heading observation channel and will begin dead-reckoning heading using the gyro in pure inertial mode until a new alignment is possible.

During transit, the submarine-launched vehicle may receive reliable tracking information from the submarine or may even receive GPS updates if transiting on the surface. If at any time the transit heading observer is able to estimate an alignment with a FOM lower than the current heading estimate, the heading estimation process will use this alignment value to realign.

3.6.4 Intervention

During operation, the submarine-launched vehicle monitors its heading accuracy and resultant estimated positioning error by the FOM of the current heading estimate. If the FOM of the current heading estimate exceeds an allowable threshold, the autonomous merit-based inertial navigation system will autonomously conduct a realignment procedure to acquire a new alignment for the heading estimation process. Likewise, before conducting any maneuver that requires a very accurate navigation solution, such as a harbor entry, beach landing, or vessel intercept, the submarine-launched vehicle may wish to realign to get the best heading solution possible.

The submarine-launched vehicle may use the magnetic compass observation to realign though this is not the most accurate means of alignment. By transiting steadily at the known alignment heading, the magnetic compass observation will produce an alignment estimate with a low FOM. If this FOM is lower than the FOM of the current heading estimate, the heading estimation process will realign to this alignment estimate.

The most accurate means of realigning the heading estimation process during transit is to transit on the surface with a GPS fix while maintaining a good bottom lock with the DVL. As the transit heading estimate produces an alignment estimate with a FOM lower than the current heading estimate, the autonomous merit-based inertial navigation system will realign to this alignment estimate.

4. Example Computing System

It is to be noted that any one or more of the aspects and embodiments described herein may be conveniently implemented using one or more machines (e.g., one or more computing devices part of or otherwise associated with a inertial navigations systems of the present disclosure) programmed according to the teachings of the present specification, as will be apparent to those of ordinary skill in the pertinent art(s). Appropriate software code can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

The software for any one of the methods of the present disclosure or portion(s) thereof may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Figure 5:
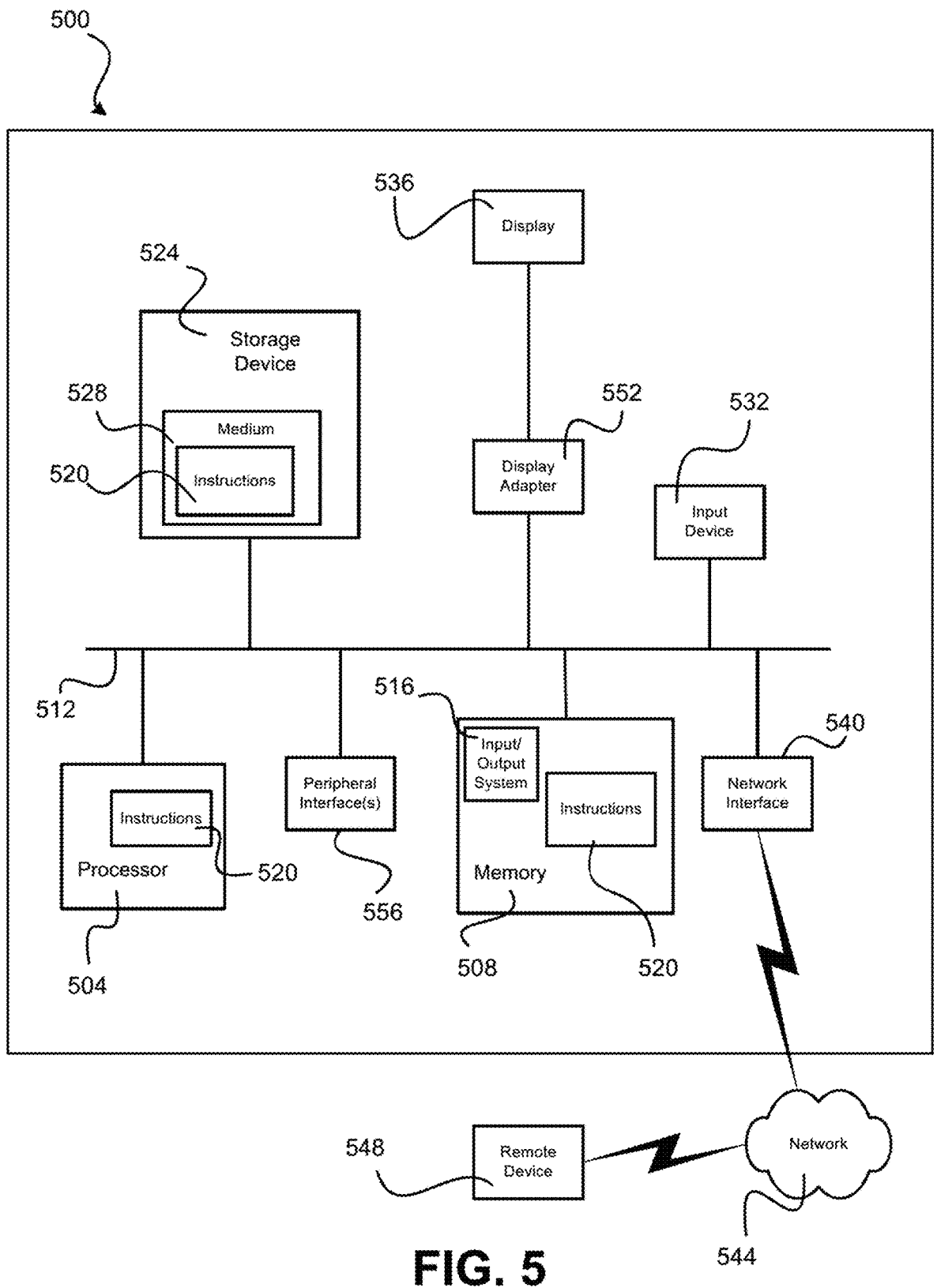
FIG. 5 is a schematic diagram of a computing system that can be used and/or modified to perform any one or more of the methodologies of the present disclosure or any portion(s) thereof.

FIG. 5 shows a diagrammatic representation of one embodiment of a computing device in the exemplary form of a computer system 500 within which a set of instructions for causing the computing system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Memory 508 may include various components (e.g., machine-readable media) including, but not limited to, a random access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 594 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

In some embodiments, the present disclosure includes on-vehicle autonomous merit-based inertial navigation systems comprising suitable hardware for executing any of methods of any one or more of claims 1-13 as originally filed, and/or any variation(s) thereof disclosed explicitly or implicitly herein. Such hardware may include various sensor, memory(ies), processor(s), and peripheral devices that make for autonomous merit-based inertial navigation systems that function as disclosed herein. In some embodiments, such on-vehicle autonomous merit-based inertial navigation systems may execute, among other machine-executable instructions, the machine-executable instructions of any one of or more of claims 14-26 as originally filed, and any variation(s) thereof disclosed explicitly or implicitly herein. In further embodiments, the present disclosure also includes vehicles, including the example vehicles mentioned above, that include autonomous merit-based inertial navigation systems based on any one or more of claims 1-26 as described immediately above, and/or any variation(s) thereof disclosed in the present disclosure, either explicitly or implicitly.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of automatically updating a heading alignment state for an inertial navigation system in parallel with a heading estimation process, the method comprising:
   executing an alignment-state estimation algorithm to determine an alignment state, the alignment-state estimation algorithm configured to utilize inertial measurement data and a figure of merit (FOM) for a heading observer selected from among a plurality of available heading observers to determine the alignment estimate;
   in parallel with the executing the alignment-state estimation algorithm, executing a run-time heading-state estimation algorithm so as to determine a heading-state estimate, wherein the run-time state estimation algorithm is configured to utilize the inertial measurement data and the alignment estimate to determine the heading-state estimate; and
   transmitting the heading-state estimate to the inertial navigation system.

2. The method of claim 1, further comprising:
   listening to a communication network for published sensor data for each of a plurality of differing state observations with no prior knowledge of a specific source of each of the differing state observations;
   for each differing state observation heard, estimating a corresponding FOM for the state observation;
   comparing the FOMs for the differing state observations with one another;
   determining a new FOM from among the FOMs, wherein the new FOM selected corresponds to the state observation having a highest reliability; and
   selecting a heading observer corresponding to the new FOM and using the published sensor data of the selected heading observer for use in the alignment-state estimation algorithm.

3. The method of claim 2, wherein the FOM is a current FOM and the method further comprises:
   receiving the new FOM;
   determining whether the new FOM is below a current FOM; and
   if the new FOM is below the current FOM, then re-initializing the alignment-state estimation algorithm.

4. The method of claim 2, wherein sensor data is genericized in creating the published sensor data.

5. The method of claim 4, wherein the published sensor data is contained in a datagram.

6. The method of claim 2, wherein selecting a heading observer includes selecting the heading observer from among an onboard heading observer and a transit-derived heading observer.

7. The method of claim 6, wherein selecting the heading observer further includes selecting from among an onboard heading observer, a transit-derived heading observer, and a scene-relative heading observer.

8. The method of claim 2, wherein selecting a heading observer includes selecting the heading observer from among an onboard heading observer and an offboard heading observer.

9. The method of claim 1, further comprising calculating the FOM for each available heading observer using a confidence weighting assigned to the each available heading observer.

10. The method of claim 1, wherein calculating the FOM for each available heading observer includes summing a reported sensor accuracy and a statistical stability for the each available heading observer in creating a sum for the each available heading observer.

11. The method of claim 10, wherein calculating the FOM for each available heading observer further includes applying a confidence weighting to the sum, wherein the confidence weighting is assigned to a corresponding sensor.

12. A method of automatically performing merit-based heading alignment in an autonomous merit-based inertial navigation system that utilizes a plurality of sensors of differing types, the method comprising:

receiving sensor data from each of the sensors;

genericizing the sensor data from each of the sensors to create genericized sensor data for each of the sensors; and publishing the genericized sensor data of each of the sensors to a generic network to provide published genericized sensor data for use by an alignment-state system listening to the generic network for the published genericized sensor data, wherein the alignment-state system is configured to:

create a plurality of heading observations based on the published genericized data;

generate a figure of merit (FOM) for each of the heading observations; and determine which heading observation to use to update an alignment based on the FOMs.

13. The method of claim 12, wherein publishing the genericized sensor data includes publishing the genericized sensor data as generic datagrams.

14. A machine-readable storage medium containing machine-executable instructions configured to perform a method of automatically updating a heading alignment state for an inertial navigation system in parallel with a heading estimation process, wherein the method comprises:

executing an alignment-state estimation algorithm to determine an alignment state, the alignment-state estimation algorithm configured to utilize inertial measurement data and a figure of merit (FOM) for a heading observer selected from among a plurality of available heading observers to determine the alignment estimate;

in parallel with the executing the alignment-state estimation algorithm, executing a run-time heading-state estimation algorithm so as to determine a heading-state estimate, wherein the run-time state estimation algorithm is configured to utilize the inertial measurement data and the alignment estimate to determine the heading-state estimate; and transmitting the heading-state estimate to the inertial navigation system.

15. The machine-readable storage medium of claim 14, further comprising:

listening to a communication network for published sensor data for each of a plurality of differing state observations with no prior knowledge of a specific source of each of the differing state observations;

for each differing state observation heard, estimating a corresponding FOM for the state observation;

comparing the FOMs for the differing state observations with one another;

determining a new FOM from among the FOMs, wherein the new FOM selected corresponds to the state observation having a highest reliability; and selecting a heading observer corresponding to the new FOM and using the published sensor data of the selected heading observer for use in the alignment-state estimation algorithm.

16. The machine-readable storage medium of claim 15, wherein the FOM is a current FOM and the method further comprises:

receiving the new FOM;

determining whether the new FOM is below a current FOM; and if the new FOM is below the current FOM, then re-initializing the alignment-state estimation algorithm.

17. The machine-readable storage medium of claim 15, wherein sensor data is genericized in creating the published sensor data.

18. The machine-readable storage medium of claim 17, wherein the published sensor data is contained in a datagram.

19. The machine-readable storage medium of claim 15, wherein selecting a heading observer includes selecting the heading observer from among an onboard heading observer and a transit-derived heading observer.

20. The machine-readable storage medium of claim 19, wherein selecting the heading observer further includes selecting from among an onboard heading observer, a transit-derived heading observer, and a scene-relative heading observer.

21. The machine-readable storage medium of claim 15, wherein selecting a heading observer includes selecting the heading observer from among an onboard heading observer and an offboard heading observer.

22. The machine-readable storage medium of claim 14, further comprising calculating the FOM for each available heading observer using a confidence weighting assigned to the each available heading observer.

23. The machine-readable storage medium of claim 14, wherein calculating the FOM for each available heading observer includes summing a reported sensor accuracy and a statistical stability for the each available heading observer in creating a sum for the each available heading observer.

24. The machine-readable storage medium of claim 23, wherein calculating the FOM for each available heading observer further includes applying a confidence weighting to the sum, wherein the confidence weighting is assigned to a corresponding sensor.

25. A machine-readable storage medium of automatically performing merit-based heading alignment in an autonomous merit-based inertial navigation system that utilizes a plurality of sensors of differing types, the method comprising:

receiving sensor data from each of the sensors;

genericizing the sensor data from each of the sensors to create genericized sensor data for each of the sensors; and publishing the genericized sensor data of each of the sensors to a generic network to provide published genericized sensor data for use by an alignment-state system listening to the generic network for the published genericized sensor data, wherein the alignment-state system is configured to:

create a plurality of heading observations based on the published genericized data;

generate a figure of merit (FOM) for each of the heading observations; and determine which heading observation to use to update an alignment based on the FOMs.

26. The machine-readable storage medium of claim 25, wherein publishing the genericized sensor data includes publishing the genericized sensor data as generic datagrams.

* * * * *